US010361951B2

(12) United States Patent
Chunduri et al.

(10) Patent No.: US 10,361,951 B2
(45) Date of Patent: Jul. 23, 2019

(54) PSEUDO-WIRE SIGNALING FRAMEWORK USING INTERIOR GATEWAY PROTOCOLS

(71) Applicant: Telefonaktiebolaget LM Ericsson (publ), Stockholm (SE)

(72) Inventors: Uma S. Chunduri, Fremont, CA (US); Kiran Sasidharan Pillai, Fremont, CA (US); Evgeny Tantsura, Palo Alto, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/089,123

(22) PCT Filed: May 31, 2016

(86) PCT No.: PCT/IB2016/053201
§ 371 (c)(1),
(2) Date: Sep. 27, 2018

(87) PCT Pub. No.: WO2017/168218
PCT Pub. Date: Oct. 5, 2017

(65) Prior Publication Data
US 2019/0109785 A1   Apr. 11, 2019

Related U.S. Application Data

(60) Provisional application No. 62/316,494, filed on Mar. 31, 2016.

(51) Int. Cl.
*H04L 12/721* (2013.01)
*H04L 12/741* (2013.01)

(52) U.S. Cl.
CPC ............. *H04L 45/68* (2013.01); *H04L 45/32* (2013.01); *H04L 45/54* (2013.01)

(58) Field of Classification Search
CPC .......... H04L 45/68; H04L 45/32; H04L 45/54
See application file for complete search history.

(56) References Cited

U.S. PATENT DOCUMENTS 8,208,404 B1 * 6/2012 Kothari ............... H04L 12/4633
370/254
8,422,514 B1   4/2013 Kothari et al.
(Continued)

OTHER PUBLICATIONS

RFC 2277: Alvestrand, "IETF Policy on Character Sets and Languages," Network Working Group, Request for Comments: 2277, Jan. 1998, pp. 1-9.

(Continued)

*Primary Examiner* — Luat Phung
(74) *Attorney, Agent, or Firm* — Nicholson De Vos Webster & Elliott LLP

(57) ABSTRACT

A method is implemented by a first Provider Edge (PE) network device in a network to configure a pseudo-wire (PW) between the first PE network device and a second PE network device in the network using an Interior Gateway Protocol (IGP). The method includes receiving a first advertisement message flooded in the network by the second PE network device via the IGP, where the first advertisement message advertises the PW. The method further includes configuring a local forwarding information base with a local PW label associated with the PW such that the first PE network device forwards traffic encapsulated with the local PW label to an Attachment Circuit associated with the PW and flooding a second advertisement message in the network via the IGP that includes an indication that the first PE network device is ready to receive traffic from the second PE network device over the PW.

24 Claims, 9 Drawing Sheets

(56) References Cited

U.S. PATENT DOCUMENTS

| | | | |
|---|---|---|---|
| 2006/0291445 A1 | 12/2006 | Martini et al. | |
| 2008/0225864 A1* | 9/2008 | Aissaoui | H04L 12/4633 370/401 |
| 2008/0270580 A1 | 10/2008 | Lange et al. | |
| 2009/0327797 A1* | 12/2009 | Wei | H04L 12/4641 714/2 |
| 2010/0329109 A1* | 12/2010 | Kothari | H04L 45/16 370/216 |
| 2012/0023242 A1* | 1/2012 | Pirbhai | H04L 29/12028 709/228 |
| 2012/0177054 A1 | 7/2012 | Pati et al. | |
| 2013/0022041 A1 | 1/2013 | Kini et al. | |
| 2013/0148657 A1* | 6/2013 | Salam | H04L 45/66 370/390 |
| 2015/0372901 A1 | 12/2015 | Pacella et al. | |

OTHER PUBLICATIONS

RFC 2460: Deering, et al., "Internet Protocol Version 6 (IPv6)," Network Working Group, Request for Comments: 2460, Dec. 1998, 39 pages.

RFC 3985: Bryant, et al., "Pseudo Wire Emulation Edge-to-Edge (PWE3) Architecture," Network Working Group, Request for Comments: 3985, Mar. 2005, 42 pages.

RFC 4447: Martini, et al., "Pseudowire Setup and Maintenance Using the Label Distribution Protocol (LDP)," Network Working Group, Request for Comments: 4447, Apr. 2006, pp. 1-33.

RFC 4761: Kompella, et al., "Virtual Private LAN Service (VPLS) Using BGP for Auto-Discovery and Signaling," Network Working Group, Request for Comments: 4761, Jan. 2007, 28 pages.

RFC 5036: Andersson, "LDP Specification," The EITF Trust, Network Working Group, Request for Comments: 5036, Oct. 2007, 135 pages.

RFC 5120: Przygienda, et al., "M-ISIS: Multi Topology (MT) Routing in Intermediate Systems (IS-ISs)," Juniper Networks, Request for Comments 5120, Feb. 2008, 14 pages RFC 6074: Rosen, et al., "Provisioning, Auto-Discovery, and Signaling in Layer 2 Virtual Private Networks (L2VPNs)," Internet Engineering Task Force (IETF), Request for Comments: 6074, Jan. 2011, pp. 1-32.

RFC 6718: Muley, et al., "Pseudowire Redundancy," Internet Engineering Task Force (IETF), Request for Comments: 6718, Aug. 2012, pp. 1-18.

RFC 791: Postel, "DARPA Internet Program Protocol Specification," Internet Protocol, Request for Comments: 791, Sep. 1981, 50 pages.

\* cited by examiner

| First PE S-bit | Second PE S-bit | Traffic Forwarding at First PE | Traffic Forwarding at Second PE |
|---|---|---|---|
| S-bit: 0<br>PW is available and sent out PW advertisement;<br>No matching PW advertisement received from second PE. | S-bit: 0<br>PW is available and sent out PW advertisement;<br>No matching PW advertisement received from first PE. | Rx: No<br>Tx: No | Rx: No<br>Tx: No |
| S-bit: 1<br>PW is available and sent out PW advertisement;<br>Received matching PW advertisement from second PE with S-bit=0. | S-bit: 0<br>PW is available and sent out PW advertisement;<br>No matching PW advertisement received from first PE. | Rx: Yes (LFIB configured with local PW label)<br>Tx: No | Rx: No<br>Tx: No |
| S-bit: 0<br>PW is available and sent out PW advertisement;<br>No matching PW advertisement received from second PE. | S-bit: 1<br>PW is available and sent out PW advertisement;<br>Received matching PW advertisement from first PE with S-bit=0. | Rx: No<br>Tx: No | Rx: Yes (LFIB configured with local PW label)<br>Tx: No |
| S-bit: 1<br>PW is available and sent out PW advertisement;<br>Received matching PW advertisement from second PE with S-bit=1. | S-bit: 1<br>PW is available and sent out PW advertisement;<br>Received matching PW advertisement from first PE with S-bit=1. | Rx: Yes (PW label installed)<br>Tx: Yes (forwarding path installed with remote PW label) | Rx: Yes (PW label installed)<br>Tx: Yes (forwarding path installed with remote PW label) |

Fig. 3

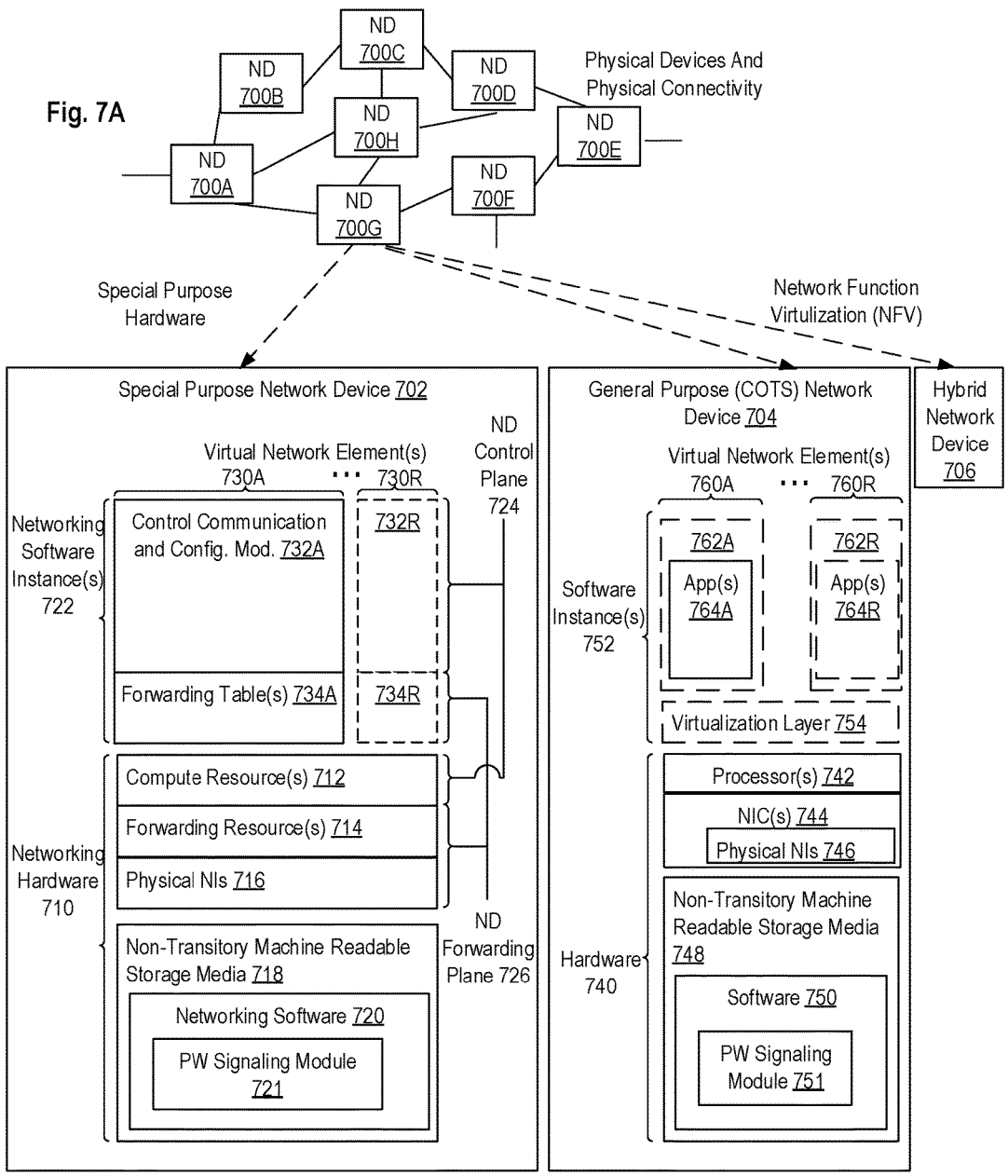

PSEUDO-WIRE SIGNALING FRAMEWORK USING INTERIOR GATEWAY PROTOCOLS

CROSS-REFERENCE TO RELATED APPLICATIONS

This application is a national stage of International Application No. PCT/IB2016/053201, filed May 31, 2016, which claims the benefit of U.S. Provisional Application No. 62/316,494, filed Mar. 31, 2016, which are hereby incorporated by reference.

TECHNICAL FIELD

Embodiments of the invention generally relate to the field of computer networks, and more specifically, to pseudo-wire signaling using an Interior Gateway Protocol.

BACKGROUND

Layer 2 services such as Frame Relay, Asynchronous Transfer Mode (ATM), and Ethernet can be emulated over a Packet-Switched Network (PSN) by encapsulating the Layer 2 Protocol Data Units (PDUs) and transmitting them over pseudo-wires (PWs). Pseudo-wire Emulation Edge-to-Edge (PWE3) defines a mechanism that emulates the essential attributes of a Layer 2 service (e.g., ATM, Frame Relay, Ethernet, etc.) over a PSN. With PWE3, a connection between Customer Edge (CE) devices located at geographically dispersed sites can be emulated using a PW. The PW emulates the transactions of a wire connecting the CEs.

A Provider Edge (PE) device provides one or more PWs on behalf of the CE devices it serves so that the CE devices can communicate over a PSN. A PSN tunnel is established to provide a data path for the PW. Native service PDUs are encapsulated and carried across the PSN via the PSN tunnel. The PE devices perform the necessary encapsulation and de-capsulation to make communication over the PW transparent to the CEs. The encapsulation includes a PW label that is used to identify the PW in the data plane. The encapsulation further includes a transport label that is used for forwarding traffic in the data plane. The PE devices are responsible for setting up, maintaining, and tearing down PWs. This includes the exchange of PW labels and transport labels between PE devices.

Conventionally, at least three different protocols are required to support PW functionality in Layer 2 Virtual Private Network (L2VPN) deployments. The first protocol is an Interior Gateway Protocol (IGP) for distributing network reachability information within the PSN (e.g., Intermediate System to Intermediate System (IS-IS) or Open Shortest Path First (OSPF)). The second protocol is a protocol for distributing transport labels (e.g., Label Distribution Protocol (LDP)). The third protocol is a protocol for exchanging PW labels (e.g., Targeted Label Distribution Protocol (Targeted LDP) or Border Gateway Protocol (BGP)). With the introduction of segment routing, an IGP can be used to exchange the transport labels. However, L2VPN deployments still require two separate protocols to support PW functionality (e.g., IGP and Targeted LDP/BGP). Employing multiple protocols to implement PWs can be operationally complex to configure, maintain, and troubleshoot.

SUMMARY

A method is implemented by a first Provider Edge (PE) network device in a network to configure a pseudo-wire (PW) between the first PE network device and a second PE network device in the network using an Interior Gateway Protocol (IGP). The method includes receiving a first advertisement message flooded in the network by the second PE network device via the IGP. The first advertisement message includes a PW association advertisement targeted to the first PE network device. The PW association advertisement includes a PW advertisement that advertises the PW. The method further includes determining whether the first PE network device supports the PW and whether the first PE network device has previously advertised the PW to the second PE network device and in response to determining that the first PE network device supports the PW and has previously advertised the PW to the second PE network device, configuring a local forwarding information base with a local PW label associated with the PW such that the first PE network device forwards traffic encapsulated with the local PW label to an Attachment Circuit (AC) associated with the PW and flooding a second advertisement message in the network via the IGP, wherein the second advertisement message includes an indication that the first PE network device is ready to receive traffic from the second PE network device over the PW.

A first Provider Edge (PE) network device is adapted to configure a pseudo-wire (PW) in a network between the first PE network device and a second PE network device in the network using an Interior Gateway Protocol (IGP). The first PE network device includes a set of one or more processors and a non-transitory machine-readable storage medium. The non-transitory machine-readable storage medium has a PW signaling module stored therein, which when executed by the set of one or more processors, causes the first PE network device to receive a first advertisement message flooded in the network by the second PE network device via the IGP. The first advertisement message includes a PW association advertisement targeted to the first PE network device. The PW association advertisement includes a PW advertisement that advertises the PW. The PW signaling module, when executed by the set of one or more processors, further causes the first PE network device to determine whether the first PE network device supports the PW and whether the first PE network device has previously advertised the PW to the second PE network device and in response to a determination that the first PE network device supports the PW and has previously advertised the PW to the second PE network device, configure a local forwarding information base with a local PW label associated with the PW such that the first PE network device forwards traffic encapsulated with the local PW label to an Attachment Circuit (AC) associated with the PW and flood a second advertisement message in the network via the IGP, where the second advertisement message includes an indication that the first PE network device is ready to receive traffic from the second PE network device over the PW.

A non-transitory machine-readable storage medium has computer code stored therein that is to be executed by a set of one or more processors of a first Provider Edge (PE) network device in a network. The computer code, when executed by the first PE network device, causes the first PE network device to perform operations for configuring a pseudo-wire (PW) between the first PE network device and a second PE network device in the network using an Interior Gateway Protocol (IGP). The operations include receiving a first advertisement message flooded in the network by the second PE network device via the IGP. The first advertisement message includes a PW association advertisement targeted to the first PE network device. The PW association advertisement includes a PW advertisement that advertises the PW. The operations further includes determining whether the first PE network device supports the PW and whether the first PE network device has previously advertised the PW to the second PE network device and in response to determining that the first PE network device supports the PW and has previously advertised the PW to the second PE network device, configuring a local forwarding information base with a local PW label associated with the PW such that the first PE network device forwards traffic encapsulated with the local PW label to an Attachment Circuit (AC) associated with the PW and flooding a second advertisement message in the network via the IGP, wherein the second advertisement message includes an indication that the first PE network device is ready to receive traffic from the second PE network device over the PW.

BRIEF DESCRIPTION OF THE DRAWINGS

The invention may best be understood by referring to the following description and accompanying drawings that are used to illustrate embodiments of the invention. In the drawings:

FIG. 3 is a table showing different states of a first PE network device and a second PE network device during PW signaling, according to some embodiments.

FIG. 7A illustrates connectivity between network devices (NDs) within an exemplary network, as well as three exemplary implementations of the NDs, according to some embodiments.

FIG. 7B illustrates an exemplary way to implement a special-purpose network device, according to some embodiments.

DETAILED DESCRIPTION

Figure 1:
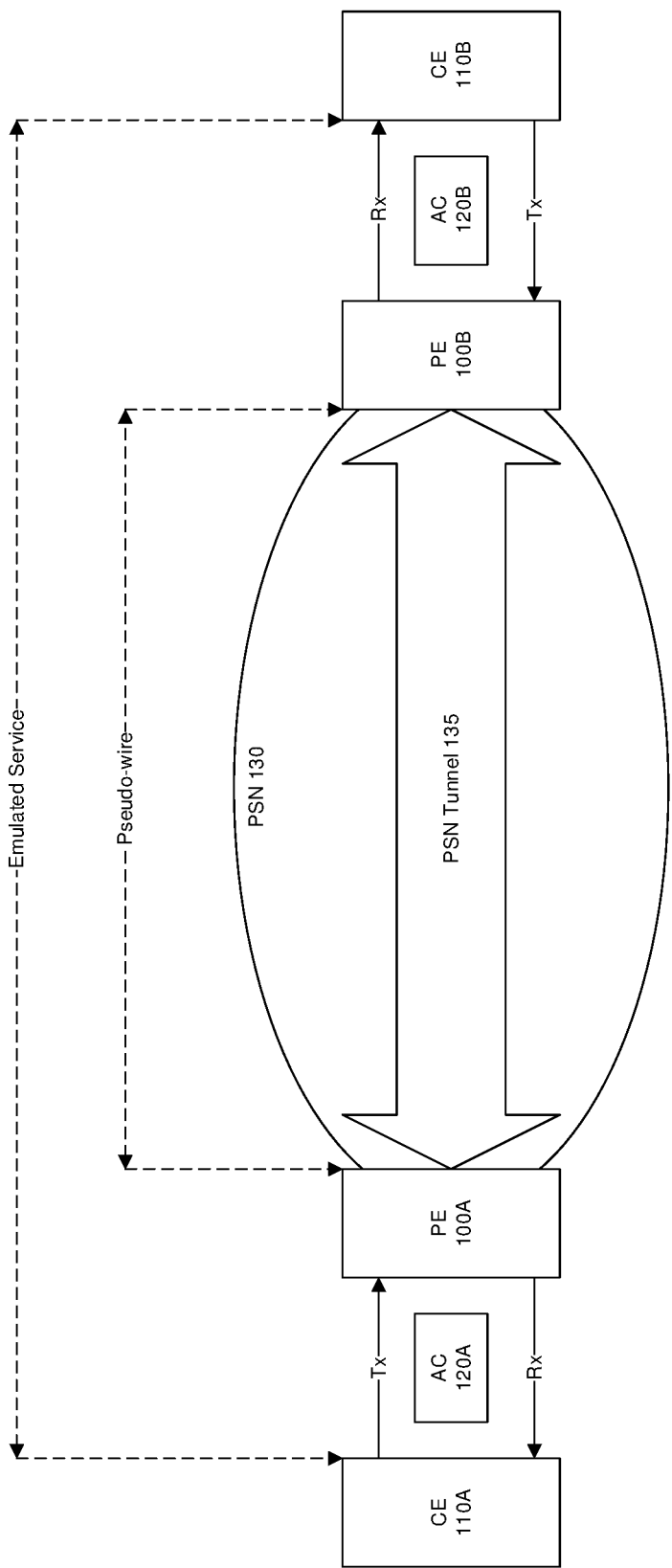
FIG. 1 is a diagram illustrating a system in which an IGP can be used for PW signaling, according to some embodiments.

The following description describes methods and apparatus for pseudo-wire (PW) signaling using an Interior Gateway Protocol (IGP). In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

With the introduction of segment routing, an IGP (e.g., Intermediate System to Intermediate System (IS-IS) or Open Shortest Path First (OSPF)) can be used for distributing transport labels for Virtual Private Network (VPN) deployments. This is achieved through the introduction of Segment Identifiers (SIDs) within an area/domain, which are unique indices in a networking area/domain that function similarly to Multiprotocol Label Switching (MPLS) labels. However, even with the introduction of segment routing, Layer 2 Virtual Private Network (L2VPN) deployments still require two separate protocols to support PW functionality. For example, L2VPN deployments still require an IGP for the distribution of transport labels (as well as network reachability information) and Targeted Label Distribution Protocol (TLDP) or Border Gateway Protocol (BGP) for the exchange of PW labels.

Embodiments described herein provide a framework for enabling an IGP to provide PW signaling to configure and maintain PWs. The PW signaling includes the exchange of PW labels. The framework thus eliminates the need for a separate protocol such as TLDP or BGP for the exchange of PW labels. As a result, a single IGP may be used for the distribution of reachability information, the distribution of transport labels, as well as the exchange of PW labels in an L2VPN deployment. An advantage of the embodiments described herein is that PW signaling is greatly simplified because only a single protocol (e.g., an IGP) is needed for PW signaling. Other embodiments are also described and claimed.

FIG. 1 is a diagram illustrating a system in which an IGP can be used for PW signaling, according to some embodiments. The system includes Customer Edge (CE) network devices 110A, 110B and Provider Edge (PE) network devices 100A, 100B. A CE network device 110 is a type of edge network device that is typically located at a customer site. A PE network device 100 is a type of edge network device that is typically located at the edge of a provider network such as Packet-Switched Network (PSN) 130. The PE network devices 100 are communicatively coupled over PSN 130. In one embodiment, the PSN may be an Internet Protocol (IP)/MPLS network.

CE network device 110A is communicatively coupled to PE network device 100A via Attachment Circuit (AC) 120A. CE network device 110B is communicatively coupled to Provider Edge (PE) network device 100B via AC 120B. An AC 120 is a physical or virtual circuit that attaches a CE network device 110 to a PE network device 100. An AC 120 may provide a connection that allows a CE network device 110 to communicate with a PE network device 100 in both the transmit (Tx) and receive (Rx) directions. PE network device 100A provides CE network device 110A with connectivity to PSN 130. PE network device 100B provides CE network device 110B with connectivity to PSN 130. PE network device 100A and PE network device 100B may each execute an IGP such as IS-IS or OSPF in the PSN 130 to learn and/or distribute network reachability information. In one embodiment, PSN 130 employs segment routing for forwarding packets in PSN 130. In such an embodiment, PE network device 100A and PE network device 100B may execute an IGP to learn and/or distribute transport labels (e.g., SIDs) that are needed for forwarding packets in the PSN 130. However, it should be understood that embodiments described herein can be implemented in a system that does not employ segment routing for forwarding packets in PSN 130. The system shown in the diagram and described herein is provided by way of example and not limitation. For the sake of simplicity and clarity, a simple system that includes two CE network devices 110A, 110B and two PE network devices 100A, 100B is shown in the diagram. It should be understood, however, that the system can include additional CE network devices 110 and PE network devices 100. It should be understood that the techniques described herein for performing PW signaling using an IGP can be implemented in a system having a different configuration than shown in the diagram.

In one embodiment, the system may emulate a native service between CE network device 110A and CE network device 110B over PSN 130 using PWs. Examples of native services that can be emulated over PSN 130 using PWs include, but are not limited to, Frame Relay, Asynchronous Transfer Mode (ATM), Ethernet, Time-Division Multiplex (TDM), and Synchronous Optical Networking/Synchronous Digital Hierarchy (SONET/SDH). A PW emulates the transactions of a wire connecting the CEs. In one embodiment, the system employs aspects of a Pseudo-wire Emulation Edge-to Edge (PWE3) architecture to emulate native services over PSN 130 using PWs.

For example, suppose that CE network device 110A wishes to transport a native service Protocol Data Unit (PDU) to CE network device 110B over the intervening PSN 130. CE network device 110A first transmits the native service PDU to PE network device 100A via AC 120A. PE network device 100A adds a PW label to a packet that will carry the native service PDU. The PW label enables the receiver to identify the particular PW on which the packet has arrived. PE network device 100A may also add a transport label to the packet, which is used for forwarding the packet through a PSN tunnel 135 in PSN 130. The PW label is sometimes referred to as the inner-label and the transport label is sometimes referred to as the outer-label. PE network device 100A then transmits the packet to PE network device 100B through PSN tunnel 135 in PSN 130. The PW label is not visible again until the packet reaches PE network device 100B. When PE network device 100B receives the packet, it can determine the particular PW on which the packet arrived based on inspecting the PW label. PE network device 100B may have previously configured an entry in its Local Forwarding Information Base (LFIB) that binds the PW label to AC 120B, which provides a connection to CE network device 110B. PE network device 100B may thus extract the native service PDU from the packet (e.g., through de-capsulation) and forward it to CE network device 110B via AC 120B. The PW formed between PE network device 100A and PE network device 100B thus allows a native service to be emulated between CE network device 110A and CE network device 110B over PSN 130.

PE network device 100A and PE network device 100B may set up and maintain the PW by signaling information about the PW to each other. This signaling may be referred to herein as PW signaling. The PW signaling may include, for example, the exchange of PW labels, the status of PWs, and other attributes of PWs. Conventionally, PE network devices 100 perform PW signaling using protocols such as TLDP or BGP. These protocols are typically employed in addition to an IGP, which is typically used for exchanging reachability information and, in some cases, for distributing transport labels (e.g., in the case of segment routing). Thus, conventional L2VPN deployments still require two separate protocols (e.g., IGP and TLDP/BGP) to support PW functionality. However, maintaining two separate protocols to support PWs may become operationally complex to configure, maintain, and troubleshoot.

Embodiments described herein overcome the deficiencies of conventional techniques by extending an IGP to support PW signaling between PE network devices 100. This eliminates the need to employ a separate protocol such as TLDP or BGP to perform PW signaling.

In one embodiment, an IGP is extended to support PW signaling between PE network devices 100 (e.g., between PE network device 100A and PE network device 100B). The PW signaling may signal information needed for setting up PWs, information regarding the status of PWs, information needed for withdrawing PWs, and other information related to the configuration and maintenance of PWs. For this purpose, an IGP advertisement message may be extended to advertise one or more PWs. If the IGP being employed is IS-IS, then the IGP advertisement message may be a link-state protocol data unit (LSP). If the IGP being employed is OSPF, then the IGP advertisement message may be a link-state advertisement (LSA).

In one embodiment, an IGP advertisement message is extended to include a PW association advertisement. A PW association advertisement includes PW advertisements for one or more PWs between a pair of endpoints (e.g., PE network devices 100). In one embodiment, the PW association advertisement includes an indication of the endpoints pertaining to the PW association advertisement. For example, the PW association advertisement may include an indication of a local endpoint and an indication of a remote endpoint, where the local endpoint is the endpoint that generates/originates the PW association advertisement and the remote endpoint is the endpoint that is the intended recipient of the PW association advertisement. In one embodiment, the PW association advertisement indicates the endpoints using the Internet Protocol (IP) address of the respective endpoints. In one embodiment, the loopback IP address (for both IP Version 4 (IPv4) and IP Version 6 (IPv6)) of the respective endpoints is used to indicate the endpoints in the PW association advertisement. A PW association advertisement that indicates a particular PE network device 100 as the remote endpoint is said to be targeted to that particular PE network device 100 and that particular PE network device 100 is said to be the target of the PW association advertisement.

Since the PW association advertisement is included as part of an IGP advertisement message (e.g., LSP or LSA), it is flooded throughout an IGP area/domain. Based on the local leaking policy (e.g., in the case of IS-IS) or inter-area policy (e.g., in the case of OSPF), the PW association advertisement may be flooded in other IGP areas/domains as well. In one embodiment, only the target of the PW association advertisement processes the PW association advertisement. Any other network devices (e.g., PE network devices 100 or transit routers) that see the PW association advertisement may effectively ignore the contents of the PW association advertisement.

In one embodiment, a PE network device 100 that has the capability to support PW signaling using an IGP indicates this capability to other PE network devices 100 in an IGP router capability advertisement. In one embodiment, a PE network device 100 only generates/originates a PW association advertisement targeted to a remote PE network device 100 if the remote PE network device 100 has advertised that it is capable of supporting PW signaling using an IGP.

As mentioned above, a PW association advertisement may include one or more PW advertisements that each advertise a particular PW between the endpoints indicated in the PW association advertisement. A PW advertisement that advertises a PW may include information regarding a PW identifier (ID) of the PW, a PW type of the PW, a PW label associated with the PW, and other information related to the PW. The PW ID is a value that identifies the PW. The PW type of the PW indicates what type of native service the PW is used to emulate (e.g., Frame Relay, ATM, Ethernet, TDM, SONET/SDH, etc.). The PW label associated with the PW is a label that the remote endpoint needs to add to a packet transmitted over the PW (as an inner-label) so that the local endpoint can forward the contents of the packet (e.g., a native service PDU) to the appropriate AC 120. In one embodiment, a PW advertisement may further include information regarding a PW status of the PW. The PW status of the PW may indicate operational information regarding the PW such as forwarding capability, mismatch in control word settings, and mismatch in Maximum Transmission Unit (MTU). In one embodiment, a PW advertisement that advertises a PW includes an S-bit for the PW. The S-bit for the PW is used to indicate that the local endpoint is ready to receive traffic from the remote endpoint over the PW.

When a first PE network device 100 (e.g., PE network device 100A) receives a PW association advertisement targeted to itself from a second PE network device 100 (e.g., PE network device 100B) (e.g., the second PE network device 100 is indicated as the local endpoint and the first PE network device 100 is indicated as the remote endpoint in the PW association advertisement), the first PE examines the PW advertisements included in the PW association advertisement. For each PW advertisement included in the PW association advertisement, the first PE network device 100 determines whether it supports the PW advertised by that PW advertisement and whether it has previously advertised that PW to the second PE network device 100. In one embodiment, the first PE network device 100 determines whether it supports the PW based on the PW ID and the PW type of the PW (indicated in the PW advertisement that advertises the PW). For example, the first PE network device 100 may have been preconfigured to support a particular PW (which corresponds to a particular AC 120). This PW can be identified by a combination of PW ID and PW type. The first PE network device 100 may determine that it supports the advertised PW based on determining that the PW ID and PW type of the advertised PW matches the PW ID and PW type of a PW that it supports. If the first PE network device 100 supports the PW and has previously advertised that PW to the second PE network device 100, the first PE network device 100 re-advertises the PW to the second PE network device 100, but this time with an S-bit set for the PW (e.g., in the PW advertisement for that PW). The setting of the S-bit for this PW indicates to the second PE network device 100 that the first PE network device 100 is ready to receive traffic from the second PE network device 100 over this PW. The first PE network device 100 may configure its LFIB with a local PW label associated with the PW (e.g., the PW label indicated in the PW advertisement that advertised the PW to the second PE network device 100) such that the first PE network device 100 forwards traffic encapsulated with the local PW label to an AC 120 associated with the PW.

If the first PE network device 100 receives a PW association advertisement targeted to itself from the second PE network device 100 that includes a PW advertisement that advertises a PW where the S-bit for the PW is set, this indicates that the second PE network device 100 is ready to receive traffic from the first PE network device 100 over the PW. Upon seeing that the S-bit for the PW is set, the first PE network device 100 may install a forwarding path that forwards traffic from an AC 120 associated with the PW towards the second PE network device 100, where the forwarding path encapsulates traffic received from the AC 120 with a remote PW label associated with the PW (e.g., the PW label indicated in the PW advertisement received from the second PE network device 100 that advertised the PW).

Some PWs may make use of a control word. A control word is a header used in some encapsulations to carry per-packet information when the PSN 130 employs MPLS. In one embodiment, a PE network device 100 may signal to a remote PE network device 100 whether control word is enabled for a particular PW in a PW advertisement for that particular PW. For example, a bit can be designated in the PW advertisement for that PW (e.g., as part of the PW status) to indicate whether control word is enabled for that PW.

In one embodiment, a PE network device 100 may signal withdrawal of a PW by including an indication in the advertisement message that the PW is withdrawn. In one embodiment, the indication that the PW is withdrawn is an omission of a PW advertisement that advertises the PW in the advertisement message. In another embodiment, the indication that the PW is withdrawn is an explicit indication in the advertisement message that the PW is withdrawn. For example, this explicit indication could be made in a PW advertisement that advertises the PW (e.g., as part of the PW status). In yet another embodiment, the indication that the PW is withdrawn is an indication in the advertisement message that the PE network device 100 does not support PW signaling using an IGP. For example, this can be indicated in an IGP router capability advertisement (e.g., omission of the capability to support PW signaling using an IGP). This implicitly indicates the withdrawal of all PWs advertised by the PE network device 100 that generated/originated the advertisement message. In yet another embodiment, the indication that the PW is withdrawn is an omission of a PW association advertisement that includes a PW advertisement that advertises the PW. This implicitly indicates the withdrawal of all PWs advertised by the PW advertisements in that PW association advertisement.

Figure 2:
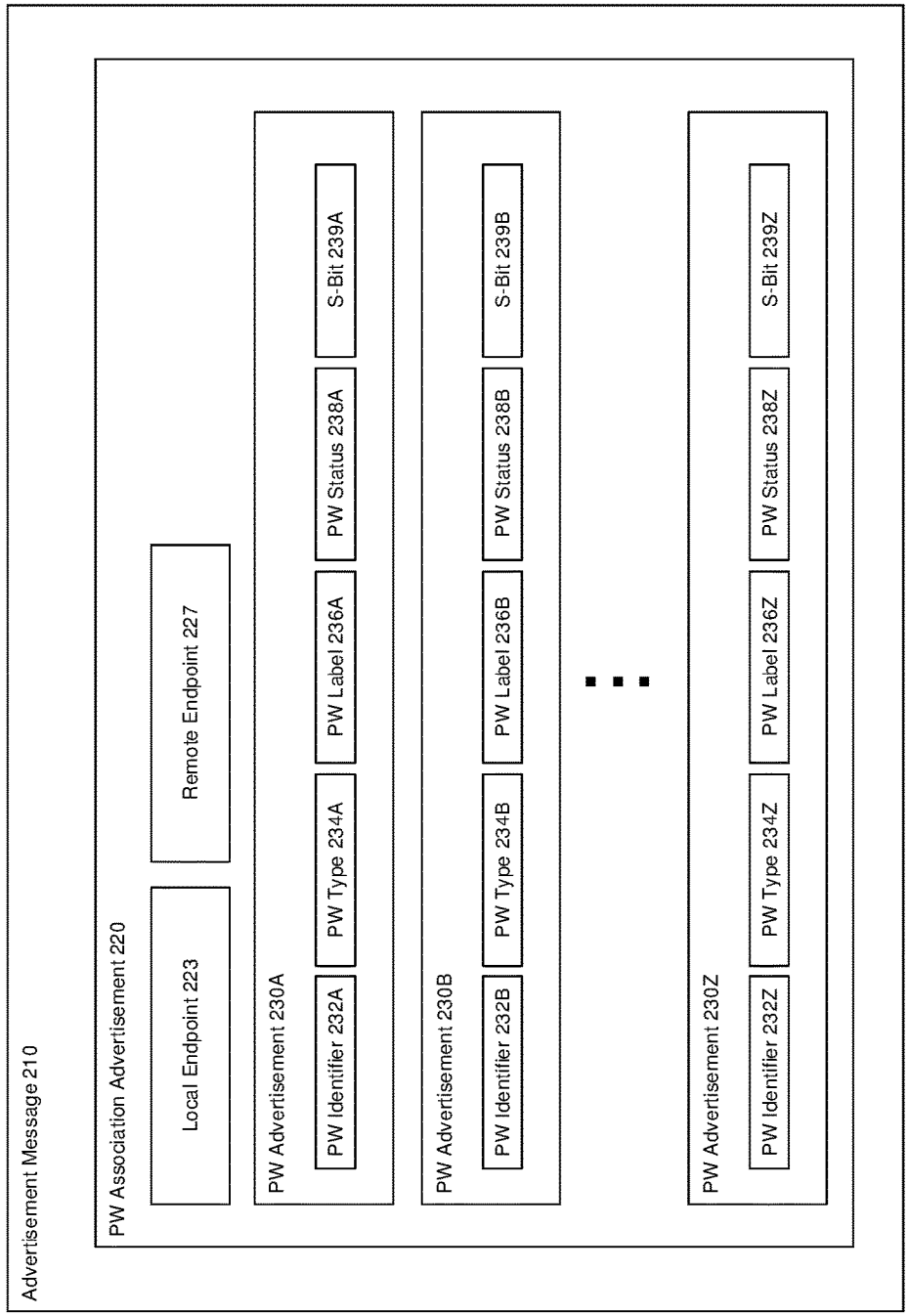
FIG. 2 is a diagram illustrating the contents of an advertisement message, according to some embodiments.

FIG. 2 is a diagram illustrating the contents of an advertisement message, according to some embodiments. The advertisement message 210 may be an IGP advertisement message such as an LSP or an LSA that is extended to support PW signaling. The advertisement message 210 includes a PW association advertisement 220. The PW association advertisement 220 may include an indication of a local endpoint 223 and an indication of a remote endpoint 227. The local endpoint is the endpoint that generates/originates the PW association advertisement 220 and the remote endpoint is the intended recipient or target of the PW association advertisement 220.

The PW association advertisement 220 further includes PW advertisements 230A-Z. Each PW advertisement 230 advertises a particular PW. As shown, each PW advertisement 230 includes a PW ID 232 of the PW that it advertises, a PW type 234 of the PW, a PW label 236 associated with the PW, a PW status 238 of the PW, and an S-bit 239 for the PW. It should be understood that the advertisement message 210, the PW association advertisement 220, and the PW advertisements 230A-Z can include other information than shown in the diagram. For example, in one embodiment, advertisement message 210 may include more than one PW association advertisement 210 (having the same endpoints or different endpoints, but with different PW advertisements 230 included therein). Also, each PW association advertisement 220 may include any number of PW advertisements 230.

In an embodiment where the advertisement message 210 is an LSP (e.g., in the case where the IGP is IS-IS), the PW association advertisement 220 may be encoded as a type-length-value (TLV) in the LSP and the PW advertisements 230A-Z may be encoded as sub-TLVs of the PW association advertisement TLV. In an embodiment where the advertisement message 210 is an LSA (e.g., in the case where the IGP is OSPF), the PW advertisements 230A-Z may be encoded as a list of PW advertisements in the LSA. A PE network device 100 may generate/originate advertisement message 210 or similar message and flood it in the network (e.g., PSN 130) to signal PW information to a remote PE network device 100 (e.g., by indicating the remote PE network device 100 as the remote endpoint in the PW association advertisement 220). This enables the PE network device 100 to provide PW signaling to the remote PE network device 100 using an IGP.

FIG. 3 is a table showing different states of a first PE network device and a second PE network device during PW signaling using an IGP, according to some embodiments. Each row in the table represents a state of the first PE network device 100 (e.g., PE network device 100A) and the second PE network device 100 (e.g., PE network device 100B) during PW signaling. The first row represents a first state, the second row represents a second state, the third row represents a third state, and the fourth row represents a fourth state. The first column represents the state of the first PE network device's 100 S-bit, the second column represents the state of the second PE network device's 100 S-bit, the third column represents the traffic forwarding state at the first PE network device 100, and the fourth column represents the traffic forwarding state at the second PE network device 100. In the first state, the first PE network device 100 has a PW available and has flooded a PW advertisement that advertises the PW. However, the first PE network device 100 has not received a matching PW advertisement that advertises the PW from the second PE network device 100. In this state, the second PE network device 100 has a PW available and has flooded a PW advertisement that advertises the PW.

However, the second PE network device 100 has not received a matching PW advertisement that advertises the PW from the first PE network device 100. In this state, the first PE network device 100 cannot receive or transmit traffic over the PW since it has not received a matching PW advertisement that advertises the PW from the second PE network device 100 (and hence S-bit is set to 0). The second PE network device 100 also cannot receive or transmit traffic over the PW for similar reasons (hence S-bit is set to 0).

In the second state, the first PE network device 100 has a PW available and has flooded a PW advertisement that advertises the PW. Also, the first PE network device 100 has received a matching PW advertisement that advertises the PW from the second PE network device 100 with S-bit set to 0. The second PE network device 100 has a PW available and has flooded a PW advertisement that advertises the PW. However, the second PE network device 100 has not received a matching PW advertisement that advertises the PW from the first PE network device 100. In this state, the first PE network device 100 can receive traffic over the PW since it has received a matching PW advertisement that advertises the PW from the second PE network device 100 (hence S-bit is set to 1 and local forwarding information base is configured with local PW label). However, the first PE network device 100 cannot transmit traffic over the PW because it has not received a matching PW advertisement that advertises the PW from the second PE network device 100 that has S-bit set to 1. The second PE network device 100 cannot receive or transmit traffic over the PW since it has not received a matching PW advertisement that advertises the PW from the first PE network device 100 (hence S-bit is set to 0).

In the third state, the first PE network device 100 has a PW available and has flooded a PW advertisement that advertises the PW. However, the first PE network device 100 has not received a matching PW advertisement that advertises the PW from the second PE network device 100. The second PE network device 100 has a PW available and has flooded a PW advertisement that advertises the PW. Also, the second PE network device 100 has received a matching PW advertisement that advertises the PW from the first PE network device 100 with S-bit set to 0. In this state, the first PE network device 100 cannot receive or transmit traffic over the PW since it has not received a matching PW advertisement that advertises the PW from the second PE network device 100 (hence S-bit is set to 0). The second PE network device 100 can receive traffic over the PW since it has received a matching PW advertisement that advertises the PW from the first PE network device 100 (hence S-bit is set to 1 and local forwarding information base is configured with local PW label). However, the second PE network device 100 cannot transmit traffic over the PW because it has not received a matching PW advertisement that advertises the PW from the first PE network device 100 that has S-bit set to 1.

In the fourth state, the first PE network device 100 has a PW available and has flooded a PW advertisement that advertises the PW. Also, the first PE network device 100 has received a matching PW advertisement that advertises the PW from the second PE network device 100 with S-bit set to 1. This indicates to the first PE network device 100 that the second PE network device 100 has successfully received the first PE network device's 100 PW advertisement and is ready to receive traffic from the first PE network device 100 over the PW. The second PE network device 100 has a PW available and has flooded a PW advertisement that advertises the PW. Also, the second PE network device 100 has received a matching PW advertisement that advertises the PW from the first PE network device 100 with S-bit set to 1. This indicates to the second PE network device 100 that the first PE network device 100 has successfully received the second PE network device's 100 PW advertisement and is ready to receive traffic from the second PE network device 100 over the PW. In this state, the first PE network device 100 can receive traffic over the PW since it has received a matching PW advertisement that advertises the PW from the second PE network device 100 (hence S-bit is set to 1 and local forwarding information base is configured with local PW label (local to the first PE network device 100)). Also, the first PE network device 100 can transmit traffic to the second PE network device 100 over the PW since it has received a matching PW advertisement that advertises the PW from the second PE with S-bit set to 1 (hence a forwarding path is installed at the first PE network device 100 with remote PW label). The second PE network device 100 can receive and transmit traffic to the first PE network device 100 over the PW for similar reasons (hence S-bit is set to 1 and local forwarding information base is configured with local PW label (local to the second PE network device 100)).

Figure 4:
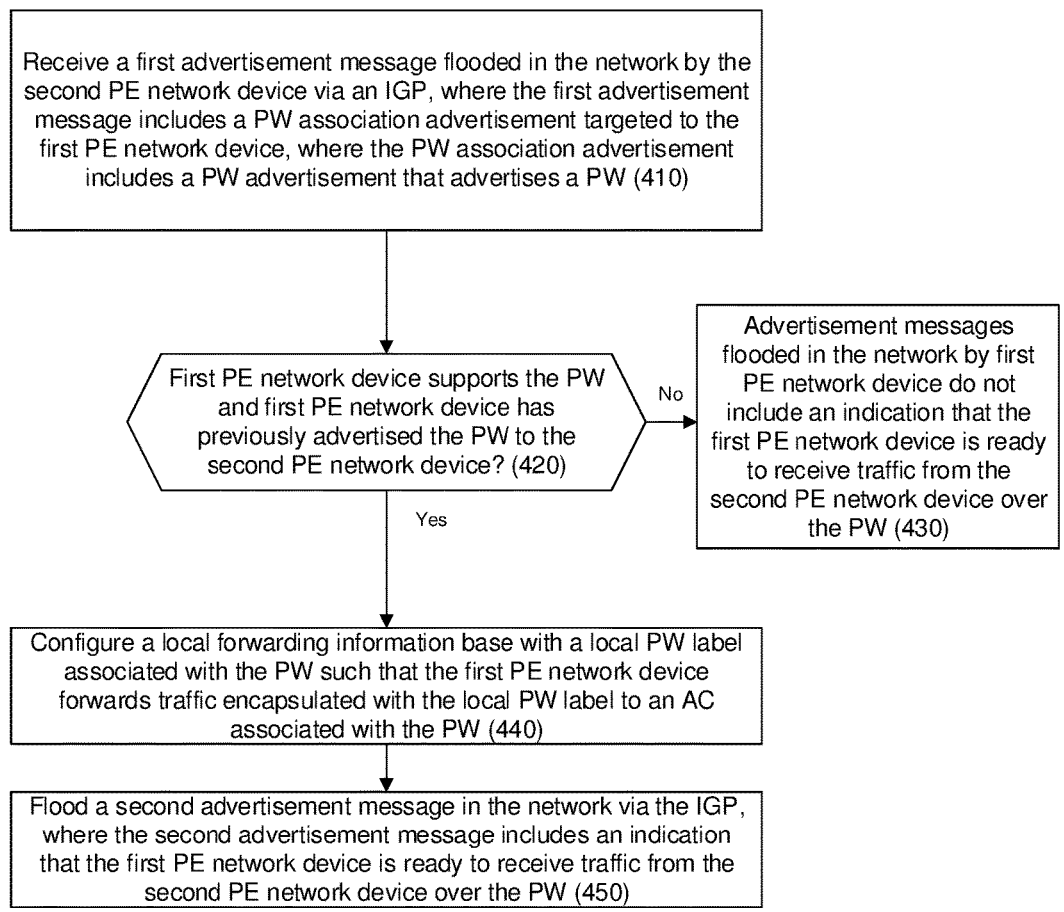
FIG. 4 is flow diagram of a process for configuring a PW between PE network devices using an IGP, according to some embodiments.

FIG. 4 is flow diagram of a process for configuring a PW between PE network devices using an IGP, according to some embodiments. In one embodiment, the operations of the flow diagram are performed by a first PE network device 100 (e.g., a router) in a network (e.g., PSN 130). The process configures a PW between the first PE network device 100 and a second PE network device 100 in the network using an IGP (e.g., IS-IS or OSPF). In particular, the process configures the first PE network device 100 to receive traffic from the second PE network device 100 over the PW. The operations in this and other flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

In one embodiment, the process is initiated when the first PE network device 100 receives a first advertisement message flooded in the network by the second PE network device via an IGP (block 410). The first advertisement message (e.g., advertisement message 210) includes a PW association advertisement targeted to the first PE network device 100. The PW association advertisement includes a PW advertisement that advertises a PW. In one embodiment, the PW advertisement includes an indication of a remote PW label associated with the PW. In one embodiment, the PW advertisement includes an indication of a PW ID of the PW and an indication of a PW type of the PW. In one embodiment, the PW advertisement includes an indication of a PW status of the PW. In an embodiment where the network employs IS-IS as the IGP, the first advertisement message may be an LSP that is extended to support PW signaling. In an embodiment where the network employs OSPF as the IGP, the first advertisement message may be an LSA that is extended to support PW signaling.

The first PE network device 100 determines whether it supports the PW and whether it has previously advertised the PW to the second PE network device 100 (decision block 420). In one embodiment, the first PE network device 100 determines whether it supports the PW based on the PW ID of the PW and the PW type of the PW indicated in the PW advertisement. For example, the first PE network device 100 may have been preconfigured to support a particular PW (which corresponds to a particular AC 120). This PW can be identified by a combination of PW ID and PW type. The first PE network device 100 may determine that it supports the advertised PW based on determining that the PW ID and PW type of the advertised PW matches the PW ID and PW type of a PW that it supports.

If the first PE network device 100 determines that it does not support the PW or that it has not previously advertised the PW to the second PE network device 100, then any advertisement message flooded in the network by the first PE network device 100 via the IGP does not include an indication that the first PE network device 100 is ready to receive traffic from the second PE network device 100 over the PW (block 430).

On the other hand, if the first PE network device 100 determines that it supports the PW and that it has previously advertised the PW to the second PE network device 100, then the first PE network device 100 configures its LFIB with a local PW label associated with the PW such that the first PE network device 100 forwards traffic encapsulated with the local PW label to an AC 120 associated with the PW (e.g., an AC 120 that communicatively couples the first PE network device 100 to a CE network device 110) (block 440). The first PE network device 100 then floods a second advertisement message in the network via the IGP (block 450). The second advertisement message (e.g., advertisement message 210) includes an indication that the first PE network device 100 is ready to receive traffic from the second PE network device 100 over the PW. In one embodiment, a single bit (e.g., S-bit) in the second advertisement message can be used to indicate whether the first PE network device 100 is ready to receive traffic from the second PE network device 100 over the PW. For example, if the S-bit is set (bit has value of 1), then this may indicate that the first PE network device 100 is ready to receive traffic from the second PE network device 100 over the PW. On the other hand, if the S-bit is not set (bit has value of 0), then this may indicate that the first PE network device 100 is not ready to receive traffic from the second PE network device 100 over the PW. The second advertisement message may include an indication of the local PW label so that the second PE network device 100 can add the local PW label to traffic that is to be transmitted over the PW. The first PE network device 100 is then ready to receive traffic from the second PE network device 100 over the PW. In one embodiment, the second advertisement message is an LSP (e.g., in the case that the IGP is IS-IS) or LSA (e.g., in the case that the IGP is OSPF) that is extended to support PW signaling.

In one embodiment, the first PE network device 100 may signal the withdrawal of the PW by flooding a third advertisement message (e.g., advertisement message 210) in the network via the IGP, where the third advertisement message includes an indication that the PW is withdrawn. In one embodiment, the indication that the PW is withdrawn is an omission of a PW advertisement that advertises the PW in the advertisement message. In another embodiment, the indication that the PW is withdrawn is an explicit indication in the advertisement message that the PW is withdrawn (e.g., as part of the PW status for the PW). In yet another embodiment, the indication that the PW is withdrawn is an indication in the advertisement message that the PE network device 100 does not support PW signaling using an IGP. This implicitly indicates the withdrawal of all PWs advertised by the PE network device 100 that generated/originated the advertisement message. In yet another embodiment, the indication that the PW is withdrawn is an omission of a PW association advertisement that includes a PW advertisement for that PW. This implicitly indicates the withdrawal of all PWs advertised in the PW association advertisement. In one embodiment, the third advertisement message is an LSP (e.g., in the case that the IGP is IS-IS) or LSA (e.g., in the case that the IGP is OSPF) that is extended to support PW signaling.

Figure 5:
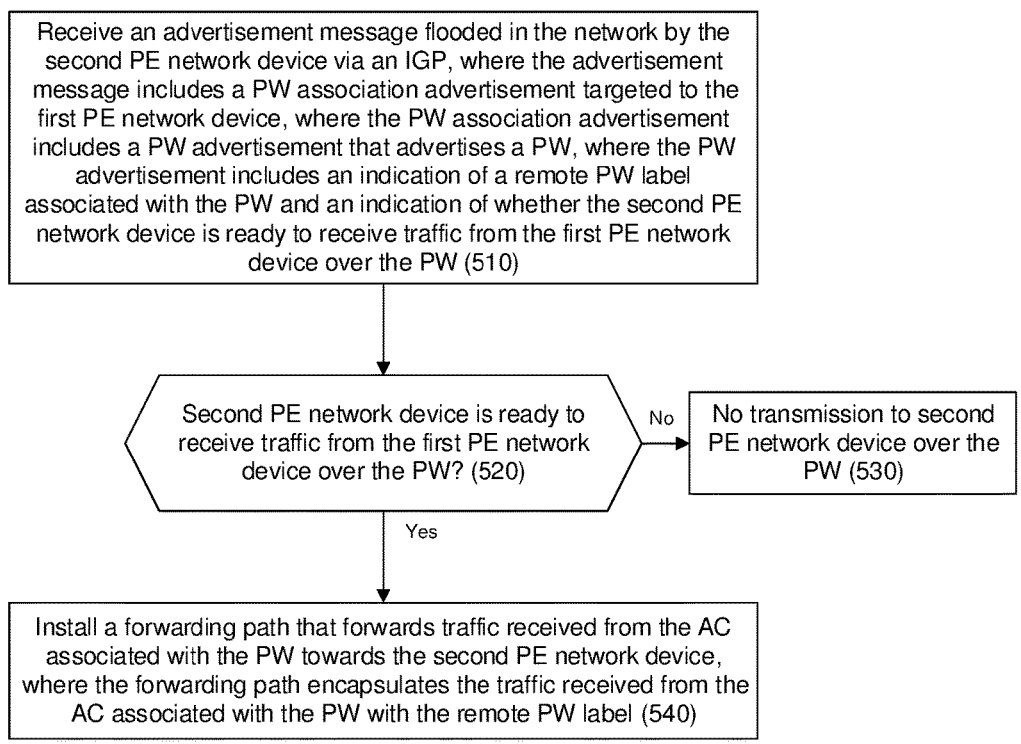
FIG. 5 is flow diagram of a process for configuring a PW between PE network devices using an IGP, according to some embodiments.

FIG. 5 is flow diagram of a process for configuring a PW between PE network devices using an IGP, according to some embodiments. In one embodiment, the operations of the flow diagram are performed by a first PE network device 100 (e.g., a router) in a network (e.g., PSN 130). The process configures a PW between the first PE network device 100 and a second PE network device 100 in the network using an IGP (e.g., IS-IS or OSPF). In particular, the process configures the first PE network device 100 to transmit traffic to the second PE network device 100 over the PW.

In one embodiment, the process is initiated when the first PE network device 100 receives an advertisement message flooded in the network by the second PE network device via an IGP (block 510). The advertisement message (e.g., advertisement message 210) includes a PW association advertisement targeted to the first PE network device 100. The PW association advertisement includes a PW advertisement that advertises the PW. The PW advertisement includes an indication of a remote PW label associated with the PW and an indication of whether the second PE network device 100 is ready to receive traffic from the first PE network device 100 over the PW. In one embodiment, a single bit (e.g., S-bit) in the advertisement message can be used to indicate whether the second PE network device 100 is ready to receive traffic from the first PE network device 100 over the PW. For example, if the S-bit is set (bit has value of 1), then this may indicate that the second PE network device 100 is ready to receive traffic from the first PE network device 100 over the PW. On the other hand, if the S-bit is not set (bit has value of 0), then this may indicate that the second PE network device 100 is not ready to receive traffic from the first PE network device 100 over the PW. In an embodiment where the network employs IS-IS as the IGP, the first advertisement message may be an LSP that is extended to support PW signaling. In an embodiment where the network employs OSPF as the IGP, the first advertisement message may be an LSA that is extended to support PW signaling.

The first PE network device 100 determines whether the second PE network device 100 is ready to receive traffic from the first PE network device 100 over the PW (decision block 520). The first PE network device may make this determination based on the indication included in the received advertisement message (e.g., the S-bit). If the second PE network device 100 is not ready to receive traffic from the first PE network device 100 over the PW (e.g., S-bit is not set), then the first PE network device 100 does not transmit traffic to the second PE network device 100 over the PW (block 530).

On the other hand, if the second PE network device 100 is ready to receive traffic from the first PE network device 100 over the PW (e.g., S-bit is set), then the first PE network device 100 installs a forwarding path that forwards traffic received from the AC 120 associated with the PW (e.g., an AC 120 that communicatively couples a CE network device 110 to the first PE network device 100) towards the second PE network device 100, where the forwarding path encapsulates the traffic received from the AC 120 associated with the PW with the remote PW label (block 540). The first PE network device 100 is then ready to transmit traffic to the second PE network device 100 over the PW.

In one embodiment, a PE network device 100 may provision a set of redundant PWs in order to maintain connectivity across the PSN 130 used by an emulated native service in case a component in the path of the emulated native service fails. The PE network device 100 may select which PW from the set of redundant PWs to activate at any given time for the purpose of transmitting customer traffic (e.g., traffic between CE network devices 110). This selection may be made based on configurations and/or local policy. For example, this selection may take into account the local state of the PWs and their associated ACs 120, as well as the remote state of the PW and their associated ACs 120, as indicated as part of the PW statuses for the PWs advertised by the remote PE network device(s) 100. The PW that is selected for transmitting customer traffic is referred to as the active PW. The other PWs are in standby mode and are not used for transmitting customer traffic. These PWs are referred to as standby PWs.

In one embodiment, the PE network device 100 may signal to the remote PE network device 100 whether a particular PW is the active PW as part of a PW advertisement that advertises that particular PW. For example, a preferential forwarding status bit can be designated in the PW advertisement (e.g., as part of the PW status) to indicate whether that PW is the active PW. In one embodiment, the PE network device 100 may indicate to the remote PE network device 100 whether a particular PW is a standby PW as part of a PW advertisement that advertises that particular PW. For example, a forwarding standby status bit can be designated in the PW advertisement (e.g., as part of the PW status) to indicate whether the PW is a standby PW. The remote PE network device 100 that receives a PW advertisement indicating that a particular PW is the active PW may honor that advertisement and configure that particular PW to be the active PW. The other PWs will be indicated as standby PWs and will not be used to carry traffic. If the PE network device 100 detects that the active PW has failed, then the PE network device 100 may signal to the remote PE network device 100 that one of the standby PWs should become the new active PW by indicating this in the PW advertisement that advertises that PW. For example, the PE network device 100 may set the preferential forwarding status bit for the new active PW (and reset the forwarding standby status bit for this PW). The PE network device 100 may then set the standby status bit for the other redundant PWs to indicate that the other redundant PWs are standby PWs. The remote PE network device 100 that receives such PW advertisements may honor the advertisements and configure the new active PW to be the active PW, thereby enabling PW switchover. In one embodiment, the PE network device 100 can signal the remote network device to do a switchover to a standby/backup PW. For example, a switchover status bit can be designated in the PW advertisement (e.g., as part of the PW status) to indicate that switchover is needed. The remote PE network device 100 that receives such PW advertisement may honor this request and perform switchover to a standby/backup PW. This enables PW signaling for providing 1:1 or 1:n protection using redundant PWs.

Figure 6A:
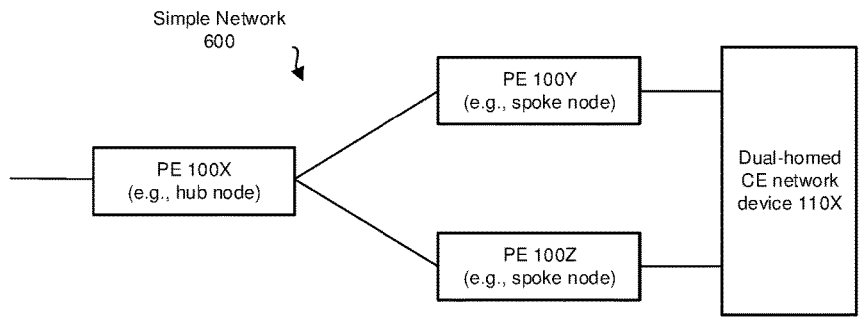
FIG. 6A is a diagram illustrating a simple network in which switchover between redundant PWs can be implemented, according to some embodiments.
Figure 6B:
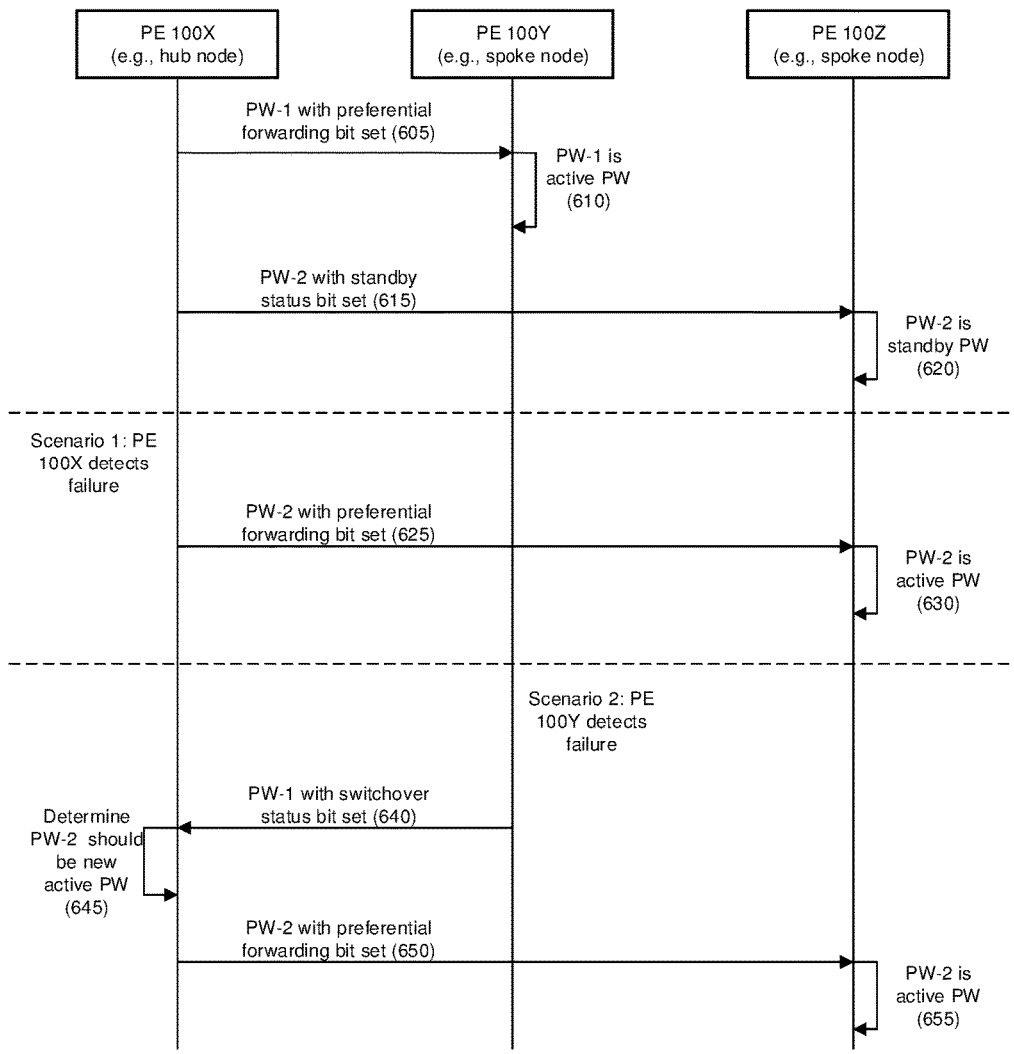
FIG. 6B is a timing diagram illustrating operations for signaling switchover between redundant PWs, according to some embodiments.

FIG. 6A is a diagram illustrating a simple network in which switchover between redundant PWs can be implemented, according to some embodiments. FIG. 6B is a timing diagram illustrating operations for signaling switchover between redundant PWs in the simple network, according to some embodiments. Referring to FIG. 6A, the simple network 600 includes PE network device 100X, PE network device 100Y, PE network device 100Z, and dual-homed CE network device 110X. PE network device 100X is communicatively coupled to PE network device 100Y and PE network device 100Z (e.g., over PSN 130, which is not illustrated here for the sake of simplicity). Dual-homed CE network device 110X is communicatively coupled to both PE network device 100Y and PE network device 100Z. PE 100X may be a hub node, while PE network device 100Y and PE network device 100Z may be spoke nodes. Two different PWs (PW-1 and PW-2) may be provisioned as a set of redundant PWs to provide protection in case one of the PWs fail (e.g., due to a failure of PE network device 100Y or a failure of PE network device 100Z or an AC 110 associated therewith (not illustrated)). The endpoints for PW-1 are PE network device 100X and PE network device 100Y. The endpoints for PW-2 are PE network device 100X and PE network device 100Z. Referring to FIG. 6B, PE network device 100X advertises PW-1 to PE network device 100Y with the preferential forwarding status bit set to indicate that PW-1 is the active PW (operation 605). For example, PE network device 100X may accomplish this by flooding an advertisement message in the network via an IGP, where the advertisement message includes an indication that the PW should be an active PW among a set of redundant PWs. PE network device 100Y honors this advertisement and configures PW-1 to be the active PW (traffic is transmitted over PW-1) (operation 610). PE network device 100X advertises PW-2 to PE network device 100Z with the forwarding standby status bit set to indicate that PW-2 is a standby PW (operation 615). For example, PE network device 100X may accomplish this by flooding an advertisement message in the network via an IGP, where the advertisement message includes an indication that the PW should be a standby PW among a set of redundant PWs. PE network device 100Z honors this advertisement and configures PW-2 to be a standby PW (traffic is not transmitted over PW-2) (operation 620).

The diagram shows two different scenarios for switchover. The first scenario is when PE network device 100X detects the failure of PW-1 and the second scenario is when PE network device 100Y detects the failure of PW-1 (e.g., failure of local AC associated with PW-1). In the first scenario, when PE network device 100X detects that PW-1 has failed, it advertises PW-2 to PE network device 100Z with the preferential forwarding status bit set to indicate that PW-2 is now the active PW (operation 625). For example, PE network device 100Y may accomplish this by flooding an advertisement message in the network via an IGP, where the advertisement message includes an indication that switchover is needed for the PW to another PW among a set of redundant PWs for the PW (e.g., because PW has failed). PE network device 100Z honors this advertisement and configures PW-2 to be the active PW (traffic is transmitted over PW-2 now) (operation 630). In the second scenario, when PE network device 100Y detects that PW-1 has failed, it advertises PW-1 to PE network device 100X with the switchover status bit set to indicate that switchover is needed (operation 640). PE network device 100X honors this advertisement and determines that PW-2 should be the new active PW and that PW-1 should be a standby PW (operation 645). PE network device 100X may then advertise PW-2 to PE network device 100Z with the preferential forwarding status bit set to indicate that PW-2 is the new active PW (operation 650). PE network device 100Z honors this advertisement and configures PW-2 to be the active PW (traffic is transmitted over PW-2 now) (operation 655).

With LDP, PWs can be identified via either FEC 128 (PW identifier FEC element) or FEC 129 (generalized FEC element). Embodiments have been primarily described with respect to the former case, where each PW has a unique PW ID and each endpoint has been configured with that value. Generalized FEC element requires that the PW endpoint be uniquely identified. The PW itself is identified as a pair of endpoints. In addition, the endpoint identifiers are structured to support applications where the identity of the remote endpoints needs to be auto-discovered rather than statically configured. In one embodiment, an IGP can be extended in a similar fashion as described above to support PW signaling for such generalized PWs.

An advantage of the embodiments described herein is that network operation is simplified with reduced state in the network and less number of control plane protocols for supporting PW functionality in an L2VPN deployment (e.g., the need for TLDP for PW signaling is eliminated). Another advantage of the embodiments described herein is that there are less TCP socket scaling issues. Kernels are typically limited in the number of sockets they can support. Each TLDP session uses a socket and thus scalability of a technique that relies on TLDP is restricted by the number of sockets that a kernel can support. Since embodiments described herein use an IGP for PW signaling (instead of TLDP), they are agnostic to kernel socket limitations. Yet another advantage of the embodiments described herein is that security can be handled by the IGP and thus there is no need for separate security protocols such as TCP Authentication Option (TCP-AO), which is needed for TLDP. Yet another advantage of the embodiments described herein is that there are no special protocol synchronization mechanisms needed to synchronize different protocols during link flaps and restorations (e.g., LDP-IGP synchronization). Other advantages than the ones explicitly stated herein will be readily apparent from the descriptions provided herein.

FIG. 7A illustrates connectivity between network devices (NDs) within an exemplary network, as well as three exemplary implementations of the NDs, according to some embodiments of the invention. FIG. 7A shows NDs 700A-H, and their connectivity by way of lines between 700A-700B, 700B-700C, 700C-700D, 700D-700E, 700E-700F, 700F-700G, and 700A-700G, as well as between 700H and each of 700A, 700C, 700D, and 700G. These NDs are physical devices, and the connectivity between these NDs can be wireless or wired (often referred to as a link). An additional line extending from NDs 700A, 700E, and 700F illustrates that these NDs act as ingress and egress points for the network (and thus, these NDs are sometimes referred to as edge NDs; while the other NDs may be called core NDs).

Two of the exemplary ND implementations in FIG. 7A are: 1) a special-purpose network device 702 that uses custom application—specific integrated—circuits (ASICs) and a special-purpose operating system (OS); and 2) a general purpose network device 704 that uses common off-the-shelf (COTS) processors and a standard OS.

The special-purpose network device 702 includes networking hardware 710 comprising compute resource(s) 712 (which typically include a set of one or more processors), forwarding resource(s) 714 (which typically include one or more ASICs and/or network processors), and physical network interfaces (NIs) 716 (sometimes called physical ports), as well as non-transitory machine readable storage media 718 having stored therein networking software 720. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 700A-H. During operation, the networking software 720 may be executed by the networking hardware 710 to instantiate a set of one or more networking software instance(s) 722. Each of the networking software instance(s) 722, and that part of the networking hardware 710 that executes that network software instance (be it hardware dedicated to that networking software instance and/or time slices of hardware temporally shared by that networking software instance with others of the networking software instance(s) 722), form a separate virtual network element 730A-R. Each of the virtual network element(s) (VNEs) 730A-R includes a control communication and configuration module 732A-R (sometimes referred to as a local control module or control communication module) and forwarding table(s) 734A-R, such that a given virtual network element (e.g., 730A) includes the control communication and configuration module (e.g., 732A), a set of one or more forwarding table(s) (e.g., 734A), and that portion of the networking hardware 710 that executes the virtual network element (e.g., 730A).

Software 720 can include code such as PW signaling module 721, which when executed by networking hardware 710, causes the special-purpose network device 702 to perform operations of one or more embodiments of the present invention as part networking software instances 722.

The special-purpose network device 702 is often physically and/or logically considered to include: 1) a ND control plane 724 (sometimes referred to as a control plane) comprising the compute resource(s) 712 that execute the control communication and configuration module(s) 732A-R; and 2) a ND forwarding plane 726 (sometimes referred to as a forwarding plane, a data plane, or a media plane) comprising the forwarding resource(s) 714 that utilize the forwarding table(s) 734A-R and the physical NIs 716. By way of example, where the ND is a router (or is implementing routing functionality), the ND control plane 724 (the compute resource(s) 712 executing the control communication and configuration module(s) 732A-R) is typically responsible for participating in controlling how data (e.g., packets) is to be routed (e.g., the next hop for the data and the outgoing physical NI for that data) and storing that routing information in the forwarding table(s) 734A-R, and the ND forwarding plane 726 is responsible for receiving that data on the physical NIs 716 and forwarding that data out the appropriate ones of the physical NIs 716 based on the forwarding table(s) 734A-R.

FIG. 7B illustrates an exemplary way to implement the special-purpose network device 702 according to some embodiments of the invention. FIG. 7B shows a special-purpose network device including cards 738 (typically hot pluggable). While in some embodiments the cards 738 are of two types (one or more that operate as the ND forwarding plane 726 (sometimes called line cards), and one or more that operate to implement the ND control plane 724 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/ Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 736 (e.g., a first full mesh coupling the line cards and a second full mesh coupling all of the cards).

Returning to FIG. 7A, the general purpose network device 704 includes hardware 740 comprising a set of one or more processor(s) 742 (which are often COTS processors) and network interface controller(s) 744 (NICs; also known as network interface cards) (which include physical NIs 746), as well as non-transitory machine readable storage media 748 having stored therein software 750. During operation, the processor(s) 742 execute the software 750 to instantiate one or more sets of one or more applications 764A-R. While one embodiment does not implement virtualization, alternative embodiments may use different forms of virtualization. For example, in one such alternative embodiment the virtualization layer 754 represents the kernel of an operating system (or a shim executing on a base operating system) that allows for the creation of multiple instances 762A-R called software containers that may each be used to execute one (or more) of the sets of applications 764A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 754 represents a hypervisor (sometimes referred to as a virtual machine monitor (VMM)) or a hypervisor executing on top of a host operating system, and each of the sets of applications 764A-R is run on top of a guest operating system within an instance 762A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 740, directly on a hypervisor (in which case the unikernel is sometimes described as running within a LibOS virtual machine), or in a software container, embodiments can be implemented fully with unikernels running directly on a hypervisor represented by virtualization layer 754, unikernels running within software containers represented by instances 762A-R, or as a combination of unikernels and the above-described techniques (e.g., unikernels and virtual machines both run directly on a hypervisor, unikernels and sets of applications that are run in different software containers).

The instantiation of the one or more sets of one or more applications 764A-R, as well as virtualization if implemented, are collectively referred to as software instance(s) 752. Each set of applications 764A-R, corresponding virtualization construct (e.g., instance 762A-R) if implemented, and that part of the hardware 740 that executes them (be it hardware dedicated to that execution and/or time slices of hardware temporarily shared), forms a separate virtual network element(s) 760A-R.

The virtual network element(s) 760A-R perform similar functionality to the virtual network element(s) 730A-R— e.g., similar to the control communication and configuration module(s) 732A and forwarding table(s) 734A (this virtualization of the hardware 740 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 762A-R corresponding to one VNE 760A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 762A-R to VNEs also apply to embodiments where such a finer level of granularity and/or unikernels are used.

In certain embodiments, the virtualization layer 754 includes a virtual switch that provides similar forwarding services as a physical Ethernet switch. Specifically, this virtual switch forwards traffic between instances 762A-R and the NIC(s) 744, as well as optionally between the instances 762A-R; in addition, this virtual switch may enforce network isolation between the VNEs 760A-R that by policy are not permitted to communicate with each other (e.g., by honoring virtual local area networks (VLANs)).

Software 750 can include code such as PW signaling module 751, which when executed by processor(s) 742, cause the general purpose network device 704 to perform operations of one or more embodiments of the present invention as part software instances 762A-R.

The third exemplary ND implementation in FIG. 7A is a hybrid network device 706, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 702) could provide for para-virtualization to the networking hardware present in the hybrid network device 706.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 730A-R, VNEs 760A-R, and those in the hybrid network device 706) receives data on the physical NIs (e.g., 716, 746) and forwards that data out the appropriate ones of the physical NIs (e.g., 716, 746). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 7C:
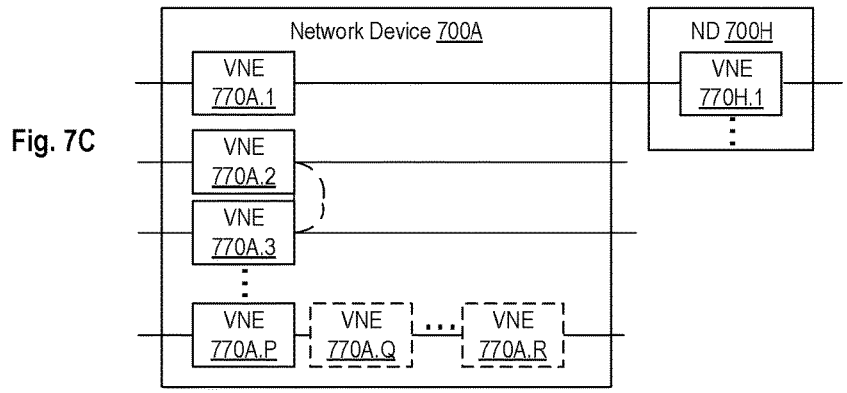
FIG. 7C illustrates various exemplary ways in which virtual network elements (VNEs) may be coupled, according to some embodiments.

FIG. 7C illustrates various exemplary ways in which VNEs may be coupled according to some embodiments of the invention. FIG. 7C shows VNEs 770A.1-770A.P (and optionally VNEs 770A.Q-770A.R) implemented in ND 700A and VNE 770H.1 in ND 700H. In FIG. 7C, VNEs 770A.1-P are separate from each other in the sense that they can receive packets from outside ND 700A and forward packets outside of ND 700A; VNE 770A.1 is coupled with VNE 770H.1, and thus they communicate packets between their respective NDs; VNE 770A.2-770A.3 may optionally forward packets between themselves without forwarding them outside of the ND 700A; and VNE 770A.P may optionally be the first in a chain of VNEs that includes VNE 770A.Q followed by VNE 770A.R (this is sometimes referred to as dynamic service chaining, where each of the VNEs in the series of VNEs provides a different service— e.g., one or more layer 4-7 network services). While FIG. 7C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 7A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 7A may also host one or more such servers (e.g., in the case of the general purpose network device 704, one or more of the software instances 762A-R may operate as servers; the same would be true for the hybrid network device 706; in the case of the special-purpose network device 702, one or more such servers could also be run on a virtualization layer executed by the compute resource(s) 712); in which case the servers are said to be co-located with the VNEs of that ND.

A virtual network is a logical abstraction of a physical network (such as that in FIG. 7A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 7D:
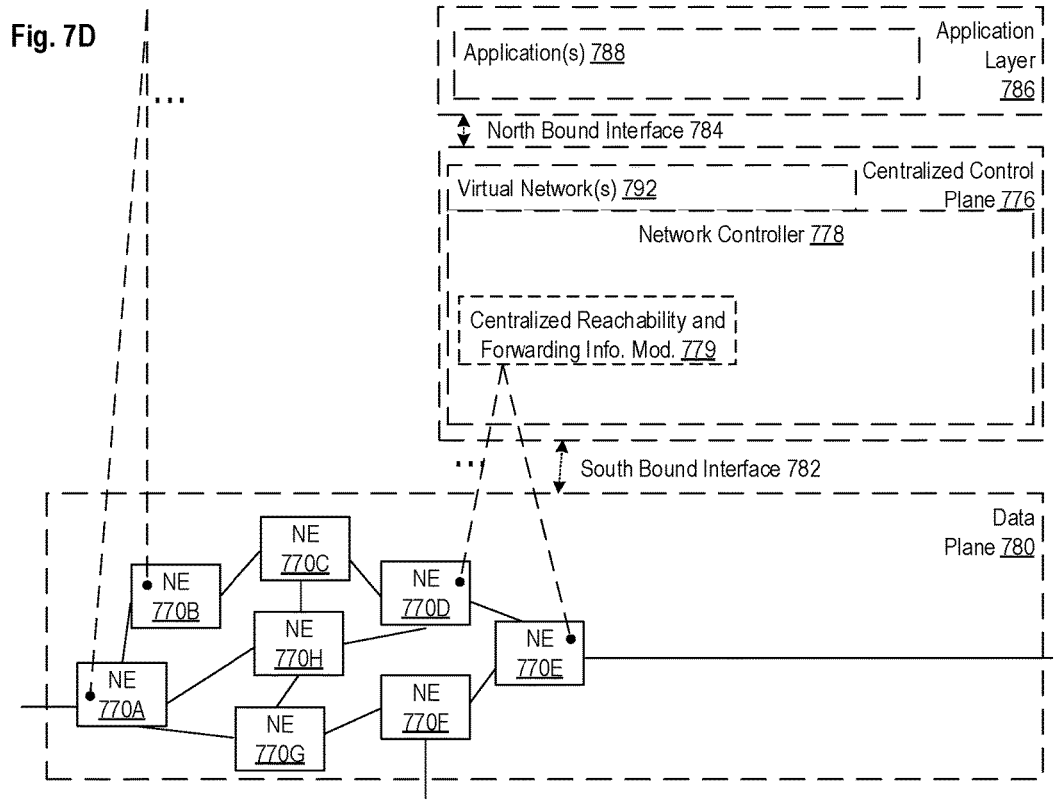
FIG. 7D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments.

FIG. 7D illustrates a network with a single network element on each of the NDs of FIG. 7A, and within this straight forward approach contrasts a traditional distributed approach (commonly used by traditional routers) with a centralized approach for maintaining reachability and forwarding information (also called network control), according to some embodiments of the invention. Specifically, FIG. 7D illustrates network elements (NEs) 770A-H with the same connectivity as the NDs 700A-H of FIG. 7A.

FIG. 7D illustrates that the distributed approach 772 distributes responsibility for generating the reachability and forwarding information across the NEs 770A-H; in other words, the process of neighbor discovery and topology discovery is distributed.

For example, where the special-purpose network device 702 is used, the control communication and configuration module(s) 732A-R of the ND control plane 724 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 770A-H (e.g., the compute resource(s) 712 executing the control communication and configuration module(s) 732A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 724. The ND control plane 724 programs the ND forwarding plane 726 with information (e.g., adjacency and route information) based on the routing structure(s). For example, the ND control plane 724 programs the adjacency and route information into one or more forwarding table(s) 734A-R (e.g., Forwarding Information Base (FIB), Label Forwarding Information Base (LFIB), and one or more adjacency structures) on the ND forwarding plane 726. For layer 2 forwarding, the ND can store one or more bridging tables that are used to forward data based on the layer 2 information in that data. While the above example uses the special-purpose network device 702, the same distributed approach 772 can be implemented on the general purpose network device 704 and the hybrid network device 706.

FIG. 7D illustrates that a centralized approach 774 (also known as software defined networking (SDN)) that decouples the system that makes decisions about where traffic is sent from the underlying systems that forwards traffic to the selected destination. The illustrated centralized approach 774 has the responsibility for the generation of reachability and forwarding information in a centralized control plane 776 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 776 has a south bound interface 782 with a data plane 780 (sometime referred to the infrastructure layer, network forwarding plane, or forwarding plane (which should not be confused with a ND forwarding plane)) that includes the NEs 770A-H (sometimes referred to as switches, forwarding elements, data plane elements, or nodes). The centralized control plane 776 includes a network controller 778, which includes a centralized reachability and forwarding information module 779 that determines the reachability within the network and distributes the forwarding information to the NEs 770A-H of the data plane 780 over the south bound interface 782 (which may use the OpenFlow protocol). Thus, the network intelligence is centralized in the centralized control plane 776 executing on electronic devices that are typically separate from the NDs.

For example, where the special-purpose network device 702 is used in the data plane 780, each of the control communication and configuration module(s) 732A-R of the ND control plane 724 typically include a control agent that provides the VNE side of the south bound interface 782. In this case, the ND control plane 724 (the compute resource(s) 712 executing the control communication and configuration module(s) 732A-R) performs its responsibility for participating in controlling how data (e.g., packets) is to be routed (e.g., the next hop for the data and the outgoing physical NI for that data) through the control agent communicating with the centralized control plane 776 to receive the forwarding information (and in some cases, the reachability information) from the centralized reachability and forwarding information module 779 (it should be understood that in some embodiments of the invention, the control communication and configuration module(s) 732A-R, in addition to communicating with the centralized control plane 776, may also play some role in determining reachability and/or calculating forwarding information—albeit less so than in the case of a distributed approach; such embodiments are generally considered to fall under the centralized approach 774, but may also be considered a hybrid approach).

While the above example uses the special-purpose network device 702, the same centralized approach 774 can be implemented with the general purpose network device 704 (e.g., each of the VNE 760A-R performs its responsibility for controlling how data (e.g., packets) is to be routed (e.g., the next hop for the data and the outgoing physical NI for that data) by communicating with the centralized control plane 776 to receive the forwarding information (and in some cases, the reachability information) from the centralized reachability and forwarding information module 779; it should be understood that in some embodiments of the invention, the VNEs 760A-R, in addition to communicating with the centralized control plane 776, may also play some role in determining reachability and/or calculating forwarding information—albeit less so than in the case of a distributed approach) and the hybrid network device 706. In fact, the use of SDN techniques can enhance the NFV techniques typically used in the general purpose network device 704 or hybrid network device 706 implementations as NFV is able to support SDN by providing an infrastructure upon which the SDN software can be run, and NFV and SDN both aim to make use of commodity server hardware and physical switches.

FIG. 7D also shows that the centralized control plane 776 has a north bound interface 784 to an application layer 786, in which resides application(s) 788. The centralized control plane 776 has the ability to form virtual networks 792 (sometimes referred to as a logical forwarding plane, network services, or overlay networks (with the NEs 770A-H of the data plane 780 being the underlay network)) for the application(s) 788. Thus, the centralized control plane 776 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 7D shows the distributed approach 772 separate from the centralized approach 774, the effort of network control may be distributed differently or the two combined in certain embodiments of the invention. For example: 1) embodiments may generally use the centralized approach (SDN) 774, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 774, but may also be considered a hybrid approach.

While FIG. 7D illustrates the simple case where each of the NDs 700A-H implements a single NE 770A-H, it should be understood that the network control approaches described with reference to FIG. 7D also work for networks where one or more of the NDs 700A-H implement multiple VNEs (e.g., VNEs 730A-R, VNEs 760A-R, those in the hybrid network device 706). Alternatively or in addition, the network controller 778 may also emulate the implementation of multiple VNEs in a single ND. Specifically, instead of (or in addition to) implementing multiple VNEs in a single ND, the network controller 778 may present the implementation of a VNE/NE in a single ND as multiple VNEs in the virtual networks 792 (all in the same one of the virtual network(s) 792, each in different ones of the virtual network(s) 792, or some combination). For example, the network controller 778 may cause an ND to implement a single VNE (a NE) in the underlay network, and then logically divide up the resources of that NE within the centralized control plane 776 to present different VNEs in the virtual network(s) 792 (where these different VNEs in the overlay networks are sharing the resources of the single VNE/NE implementation on the ND in the underlay network).

Figure 7E:
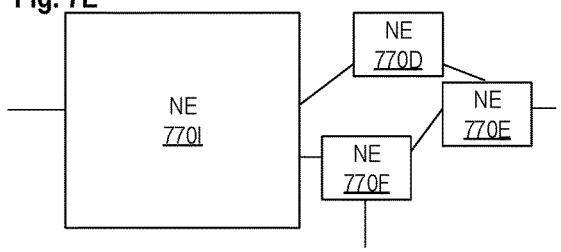
FIG. 7E illustrates the simple case of where each of the NDs implements a single NE, but a centralized control plane has abstracted multiple of the NEs in different NDs into (to represent) a single NE in one of the virtual network(s), according to some embodiments.
Figure 7F:
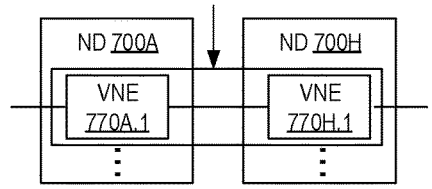
FIG. 7F illustrates a case where multiple VNEs are implemented on different NDs and are coupled to each other, and where a centralized control plane has abstracted these multiple VNEs such that they appear as a single VNE within one of the virtual networks, according to some embodiments.

On the other hand, FIGS. 7E and 7F respectively illustrate exemplary abstractions of NEs and VNEs that the network controller 778 may present as part of different ones of the virtual networks 792. FIG. 7E illustrates the simple case of where each of the NDs 700A-H implements a single NE 770A-H (see FIG. 7D), but the centralized control plane 776 has abstracted multiple of the NEs in different NDs (the NEs 770A-C and G-H) into (to represent) a single NE 770I in one of the virtual network(s) 792 of FIG. 7D, according to some embodiments of the invention. FIG. 7E shows that in this virtual network, the NE 770I is coupled to NE 770D and 770F, which are both still coupled to NE 770E.

FIG. 7F illustrates a case where multiple VNEs (VNE 770A.1 and VNE 770H.1) are implemented on different NDs (ND 700A and ND 700H) and are coupled to each other, and where the centralized control plane 776 has abstracted these multiple VNEs such that they appear as a single VNE 770T within one of the virtual networks 792 of FIG. 7D, according to some embodiments of the invention. Thus, the abstraction of a NE or VNE can span multiple NDs.

While some embodiments of the invention implement the centralized control plane 776 as a single entity (e.g., a single instance of software running on a single electronic device), alternative embodiments may spread the functionality across multiple entities for redundancy and/or scalability purposes (e.g., multiple instances of software running on different electronic devices).

Figure 8:
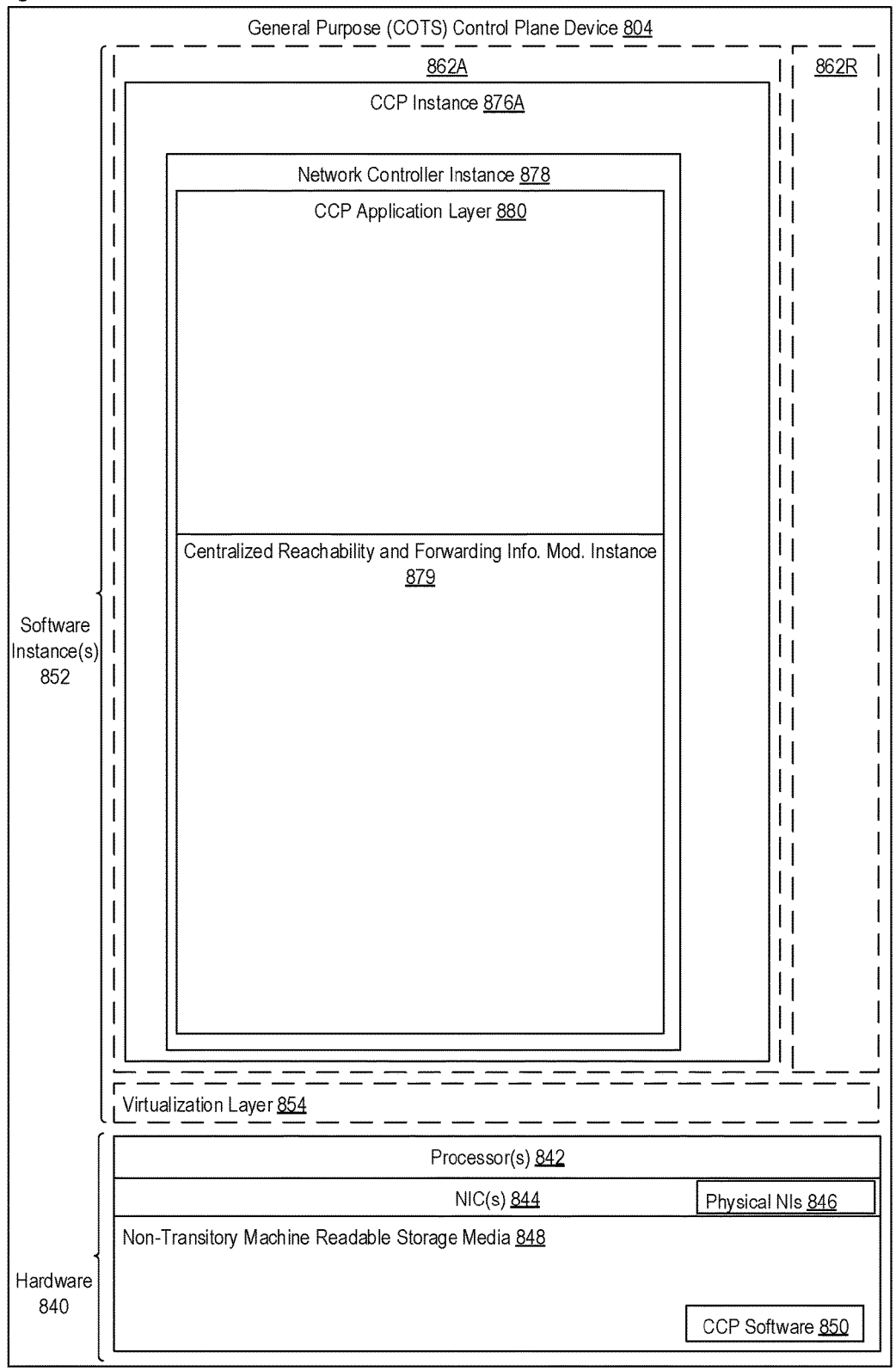
FIG. 8 illustrates a general purpose control plane device with centralized control plane (CCP) software, according to some embodiments.

Similar to the network device implementations, the electronic device(s) running the centralized control plane 776, and thus the network controller 778 including the centralized reachability and forwarding information module 779, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 8 illustrates a general purpose control plane device 804 including hardware 840 comprising a set of one or more processor(s) 842 (which are often COTS processors) and network interface controller(s) 844 (NICs; also known as network interface cards) (which include physical NIs 846), as well as non-transitory machine readable storage media 848 having stored therein centralized control plane (CCP) software 850.

In embodiments that use compute virtualization, the processor(s) 842 typically execute software to instantiate a virtualization layer 854 (e.g., in one embodiment the virtualization layer 854 represents the kernel of an operating system (or a shim executing on a base operating system) that allows for the creation of multiple instances 862A-R called software containers (representing separate user spaces and also called virtualization engines, virtual private servers, or jails) that may each be used to execute a set of one or more applications; in another embodiment the virtualization layer 854 represents a hypervisor (sometimes referred to as a virtual machine monitor (VMM)) or a hypervisor executing on top of a host operating system, and an application is run on top of a guest operating system within an instance 862A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 840, directly on a hypervisor represented by virtualization layer 854 (in which case the unikernel is sometimes described as running within a LibOS virtual machine), or in a software container represented by one of instances 862A-R). Again, in embodiments where compute virtualization is used, during operation an instance of the CCP software 850 (illustrated as CCP instance 876A) is executed (e.g., within the instance 862A) on the virtualization layer 854. In embodiments where compute virtualization is not used, the CCP instance 876A is executed, as a unikernel or on top of a host operating system, on the "bare metal" general purpose control plane device 804. The instantiation of the CCP instance 876A, as well as the virtualization layer 854 and instances 862A-R if implemented, are collectively referred to as software instance(s) 852.

In some embodiments, the CCP instance 876A includes a network controller instance 878. The network controller instance 878 includes a centralized reachability and forwarding information module instance 879 (which is a middleware layer providing the context of the network controller 778 to the operating system and communicating with the various NEs), and an CCP application layer 880 (sometimes referred to as an application layer) over the middleware layer (providing the intelligence required for various network operations such as protocols, network situational awareness, and user—interfaces). At a more abstract level, this CCP application layer 880 within the centralized control plane 776 works with virtual network view(s) (logical view(s) of the network) and the middleware layer provides the conversion from the virtual networks to the physical view.

The centralized control plane 776 transmits relevant messages to the data plane 780 based on CCP application layer 880 calculations and middleware layer mapping for each flow. A flow may be defined as a set of packets whose headers match a given pattern of bits; in this sense, traditional IP forwarding is also flow—based forwarding where the flows are defined by the destination IP address for example; however, in other implementations, the given pattern of bits used for a flow definition may include more fields (e.g., 10 or more) in the packet headers. Different NDs/NEs/VNEs of the data plane 780 may receive different messages, and thus different forwarding information. The data plane 780 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 780, the packet (or a subset of the packet header and content) is typically forwarded to the centralized control plane 776. The centralized control plane 776 will then program forwarding table entries into the data plane 780 to accommodate packets belonging to the flow of the unknown packet. Once a specific forwarding table entry has been programmed into the data plane 780 by the centralized control plane 776, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Some NDs provide support for implementing VPNs (Virtual Private Networks) (e.g., Layer 2 VPNs and/or Layer 3 VPNs). For example, the ND where a provider's network and a customer's network are coupled are respectively referred to as PEs (Provider Edge) and CEs (Customer Edge). In a Layer 2 VPN, forwarding typically is performed on the CE(s) on either end of the VPN and traffic is sent across the network (e.g., through one or more PEs coupled by other NDs). Layer 2 circuits are configured between the CEs and PEs (e.g., an Ethernet port, an ATM permanent virtual circuit (PVC), a Frame Relay PVC). In a Layer 3 VPN, routing typically is performed by the PEs. By way of example, an edge ND that supports multiple VNEs may be deployed as a PE; and a VNE may be configured with a VPN protocol, and thus that VNE is referred as a VPN VNE.

Some NDs provide support for VPLS (Virtual Private LAN Service). For example, in a VPLS network, end user devices access content/services provided through the VPLS network by coupling to CEs, which are coupled through PEs coupled by other NDs. VPLS networks can be used for implementing triple play network applications (e.g., data applications (e.g., high-speed Internet access), video applications (e.g., television service such as IPTV (Internet Protocol Television), VoD (Video-on-Demand) service), and voice applications (e.g., VoIP (Voice over Internet Protocol) service)), VPN services, etc. VPLS is a type of layer 2 VPN that can be used for multi-point connectivity. VPLS networks also allow end use devices that are coupled with CEs at separate geographical locations to communicate with each other across a Wide Area Network (WAN) as if they were directly attached to each other in a Local Area Network (LAN) (referred to as an emulated LAN).

In VPLS networks, each CE typically attaches, possibly through an access network (wired and/or wireless), to a bridge module of a PE via an Attachment Circuit (e.g., a virtual link or connection between the CE and the PE). The bridge module of the PE attaches to an emulated LAN through an emulated LAN interface. Each bridge module acts as a "Virtual Switch Instance" (VSI) by maintaining a forwarding table that maps MAC addresses to pseudo-wires and Attachment Circuits. PEs forward frames (received from CEs) to destinations (e.g., other CEs, other PEs) based on the MAC destination address field included in those frames.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments of the invention as described herein.

An embodiment of the invention may be an article of manufacture in which a non-transitory machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

What is claimed is:

1. A method implemented by a first Provider Edge (PE) network device in a network to configure a pseudo-wire (PW) between the first PE network device and a second PE network device in the network using an Interior Gateway Protocol (IGP), the method comprising:
   receiving a first advertisement message flooded in the network by the second PE network device via the IGP, wherein the first advertisement message includes a PW association advertisement targeted to the first PE network device, wherein the PW association advertisement includes a PW advertisement that advertises the PW;
   determining whether the first PE network device supports the PW and whether the first PE network device has previously advertised the PW to the second PE network device; and
   in response to determining that the first PE network device supports the PW and has previously advertised the PW to the second PE network device:
   configuring a local forwarding information base with a local PW label associated with the PW such that the first PE network device forwards traffic encapsulated with the local PW label to an Attachment Circuit (AC) associated with the PW and
   flooding a second advertisement message in the network via the IGP, wherein the second advertisement message includes an indication that the first PE network device is ready to receive traffic from the second PE network device over the PW.

2. The method of claim 1, wherein the PW advertisement includes an indication of a remote PW label associated with the PW and an indication of whether the second PE network device is ready to receive traffic from the first PE network device over the PW.

3. The method of claim 2, further comprising:
   determining whether the second PE network device is ready to receive traffic from the first PE network device over the PW based on the indication included in the PW advertisement of whether the second PE network device is ready to receive traffic from the first PE network device over the PW; and
   installing a forwarding path that forwards traffic received from the AC associated with the PW towards the second PE network device in response to determining that the second PE network device is ready to receive traffic from the first PE network device over the PW, wherein the forwarding path encapsulates the traffic received from the AC associated with the PW with the remote PW label.

4. The method of claim 1, wherein the PW advertisement includes an indication of a PW ID of the PW and an indication of a PW type of the PW, and wherein the first PE network device determines whether it supports the PW based on the PW ID of the PW and the PW type of the PW.

5. The method of claim 4, wherein the PW advertisement further includes an indication of a PW status of the PW.

6. The method of claim 1, further comprising:
   flooding a third advertisement message in the network via the IGP, wherein the third advertisement message includes an indication that the PW is withdrawn.

7. The method of claim 6, wherein the indication that the PW is withdrawn is an omission of a PW advertisement that advertises the PW in the third advertisement message.

8. The method of claim 6, wherein the indication that the PW is withdrawn is an explicit indication in the third advertisement message that the PW is withdrawn.

9. The method of claim 6, wherein the indication that the PW is withdrawn is an indication in the third advertisement message that the first PE network device does not support PW signaling using an IGP.

10. The method of claim 6, wherein the indication that the PW is withdrawn is an omission of a PW association advertisement targeted to the second PE network device in the third advertisement message.

11. The method of claim 1, wherein the IGP is Intermediate System to Intermediate System (IS-IS) and the first advertisement message is a link-state protocol data unit (LSP).

12. The method of claim 1, wherein the IGP is Open Shortest Path First (OSPF) and the first advertisement message is a link-state advertisement (LSA).

13. The method of claim 1, further comprising:
flooding a third advertisement message in the network via the IGP, wherein the third advertisement message includes an indication that the PW should be an active PW among a set of redundant PWs.

14. The method of claim 1, further comprising:
flooding a third advertisement message in the network via the IGP, wherein the third advertisement message includes an indication that the PW should be a standby PW among a set of redundant PWs.

15. The method of claim 1, further comprising:
flooding a third advertisement message in the network via the IGP, wherein the third advertisement message includes an indication that switchover is needed for the PW to another PW among a set of redundant PWs for the PW.

16. The method of claim 1, further comprising:
flooding a third advertisement message in the network via the IGP, wherein the third advertisement message includes an indication that the first PE network device has capability to support PW signaling using the IGP.

17. A first Provider Edge (PE) network device adapted to configure a pseudo-wire (PW) in a network between the first PE network device and a second PE network device in the network using an Interior Gateway Protocol (IGP), the first PE network device comprising:
a set of one or more processors and a non-transitory machine-readable storage medium, wherein the non-transitory machine-readable storage medium has a PW signaling module stored therein, which when executed by the set of one or more processors, causes the first PE network device to receive a first advertisement message flooded in the network by the second PE network device via the IGP, wherein the first advertisement message includes a PW association advertisement targeted to the first PE network device, wherein the PW association advertisement includes a PW advertisement that advertises the PW, determine whether the first PE network device supports the PW and whether the first PE network device has previously advertised the PW to the second PE network device, and in response to a determination that the first PE network device supports the PW and has previously advertised the PW to the second PE network device, configure a local forwarding information base with a local PW label associated with the PW such that the first PE network device forwards traffic encapsulated with the local PW label to an Attachment Circuit (AC) associated with the PW and flood a second advertisement message in the network via the IGP, wherein the second advertisement message includes an indication that the first PE network device is ready to receive traffic from the second PE network device over the PW.

18. The first PE network device of claim 17, wherein the PW advertisement includes an indication of a remote PW label associated with the PW and an indication of whether the second PE network device is ready to receive traffic from the first PE network device over the PW.

19. The first PE network device of claim 18, wherein the PW signaling module, which when executed by the set of one or more processors, further causes the first PE network device to determine whether the second PE network device is ready to receive traffic from the first PE network device over the PW based on the indication included in the PW advertisement of whether the second PE network device is ready to receive traffic from the first PE network device over the PW and install a forwarding path that forwards traffic received from the AC associated with the PW towards the second PE network device in response to determining that the second PE network device is ready to receive traffic from the first PE network device over the PW, wherein the forwarding path encapsulates the traffic received from the AC associated with the PW with the remote PW label.

20. A non-transitory machine-readable medium having computer code stored therein, which when executed by a set of one or more processors of a first Provider Edge (PE) network device in a network, causes the first PE network device to perform operations for configuring a pseudo-wire (PW) between the first PE network device and a second PE network device in the network using an Interior Gateway Protocol (IGP), the operations comprising:
receiving a first advertisement message flooded in the network by the second PE network device via the IGP, wherein the first advertisement message includes a PW association advertisement targeted to the first PE network device, wherein the PW association advertisement includes a PW advertisement that advertises the PW;
determining whether the first PE network device supports the PW and whether the first PE network device has previously advertised the PW to the second PE network device; and
in response to determining that the first PE network device supports the PW and has previously advertised the PW to the second PE network device:
configuring a local forwarding information base with a local PW label associated with the PW such that the first PE network device forwards traffic encapsulated with the local PW label to an Attachment Circuit (AC) associated with the PW and
flooding a second advertisement message in the network via the IGP, wherein the second advertisement message includes an indication that the first PE network device is ready to receive traffic from the second PE network device over the PW.

21. The non-transitory machine-readable medium of claim 20, wherein the PW advertisement includes an indication of a remote PW label associated with the PW and an indication of whether the second PE network device is ready to receive traffic from the first PE network device over the PW.

22. The non-transitory machine-readable medium of claim 21, wherein the computer code, when executed by the set of one or more processors of the first PE network device, causes the first PE network device to perform further operations comprising:
determining whether the second PE network device is ready to receive traffic from the first PE network device over the PW based on the indication included in the PW advertisement of whether the second PE network device is ready to receive traffic from the first PE network device over the PW; and
installing a forwarding path that forwards traffic received from the AC associated with the PW towards the second PE network device in response to determining that the second PE network device is ready to receive traffic from the first PE network device over the PW, wherein the forwarding path encapsulates the traffic received from the AC associated with the PW with the remote PW label.

23. The non-transitory machine-readable medium of claim 20, wherein the IGP is IS-IS and the first advertisement message is a link-state protocol data unit (LSP).

24. The non-transitory machine-readable medium of claim 20, wherein the IGP is OSPF and the first advertisement message is a link-state advertisement (LSA).

* * * * *